US009947474B2

(12) United States Patent
Akada et al.

(10) Patent No.: US 9,947,474 B2
(45) Date of Patent: Apr. 17, 2018

(54) MULTILAYER CAPACITOR

(71) Applicant: KYOCERA Corporation, Kyoto-shi, Kyoto (JP)

(72) Inventors: Kazuhiro Akada, Kirishima (JP); Takafumi Nogi, Kirishima (JP); Hidefumi Hatanaka, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/323,195

(22) PCT Filed: Jul. 22, 2015

(86) PCT No.: PCT/JP2015/070840
§ 371 (c)(1),
(2) Date: Dec. 30, 2016

(87) PCT Pub. No.: WO2016/013580
PCT Pub. Date: Jan. 28, 2016

(65) Prior Publication Data
US 2017/0148571 A1    May 25, 2017

(30) Foreign Application Priority Data

Jul. 24, 2014  (JP) ................................. 2014-150844
Aug. 25, 2014  (JP) ................................. 2014-170590

(51) Int. Cl.
H01G 4/005     (2006.01)
H01G 4/30      (2006.01)
H01G 4/012     (2006.01)

(52) U.S. Cl.
CPC ............... H01G 4/30 (2013.01); H01G 4/012 (2013.01)

(58) Field of Classification Search
CPC ........... H01G 4/005; H01G 4/012; H01G 4/30
See application file for complete search history.

(56) References Cited

U.S. PATENT DOCUMENTS 5,450,278 A * 9/1995 Lee .......................... H01G 4/30
                                                333/185
2008/0186652 A1* 8/2008 Lee ....................... H01G 4/012
                                                361/306.3

(Continued)

FOREIGN PATENT DOCUMENTS

JP   2005-044871 A    2/2005

OTHER PUBLICATIONS

International Search Report, PCT/JP2015/070840, dated Oct. 6, 2015, 2 pgs.

Primary Examiner — Eric Thomas
(74) Attorney, Agent, or Firm — Volpe and Koenig, P.C.

(57) ABSTRACT

A multilayer capacitor includes a first grounding internal electrode including a first grounding electrode having a lead-out part led to one side surface of a stacked body, and a second grounding electrode having a lead-out part led to the other side surface; a second grounding internal electrode including a third grounding electrode which overlaps the first grounding electrode and has a lead-out part led to the other side surface, and a fourth grounding electrode which overlaps the second grounding electrode and has a lead-out part led to one side surface; and a signal internal electrode disposed between the first and second grounding internal electrodes, wherein the first and second grounding electrodes and the third and fourth grounding electrodes have, at their adjacent opposed sides, corners curved as seen in a plan view in the stacking direction, respectively, the corners being each located opposite to the corresponding lead-out part.

9 Claims, 17 Drawing Sheets

(56) References Cited

U.S. PATENT DOCUMENTS

2009/0073634 A1* 3/2009 Lee .................. H01G 4/35
361/303
2015/0325371 A1* 11/2015 Hattori ................ H01G 4/385
361/301.4

* cited by examiner (a)

(b)

(a)

(b)

MULTILAYER CAPACITOR

TECHNICAL FIELD

The present invention relates to a multilayer capacitor which achieves reduction in ESL (Equivalent Series Inductance) in high-frequency ranges and is hence used for a noise filter and so forth.

BACKGROUND ART

As a result of their recent digitalization, information processors, communications apparatuses, and the like equipment have come to perform information processing at higher and higher speed, and hence handle digital signals of higher and higher frequencies. This creates a tendency for an increase in noise generated in such equipment in high-frequency ranges. As an anti-noise measure, for example, electronic components such as multilayer ceramic capacitors have been used. An example of the multilayer ceramic capacitor is disclosed in Patent Literature 1.

CITATION LIST

Patent Literature

Patent Literature 1: Japanese Unexamined Patent Publication JP-A 2005-44871

SUMMARY OF INVENTION

Technical Problem

Thus, the multilayer ceramic capacitor has been used in, for example, a power supply circuit of LSI such as CPU, to inhibit noise from intrusion into the LSI through a power supply line or other device, or to suppress occurrence of noise-induced failure such as malfunction in the LSI.

However, in keeping with the trend toward increasingly high frequencies for equipment such as information processors or communications apparatuses, the multilayer ceramic capacitors are required to achieve further reduction in equivalent series inductance (ESL) to reduce noise in high-frequency ranges, for example, noise in a signal line or a power supply line in high-frequency ranges.

The invention has been devised in view of the problems as discussed supra, and accordingly an object of the invention is to provide a multilayer capacitor in which a grounding internal electrode is placed to constitute a path for passing electric current to a grounding end (ground) to thereby reduce equivalent series inductance (ESL).

Solution to Problem

The invention provides a multilayer capacitor comprising: a stacked body which is composed of a stack of a plurality of dielectric layers and has a pair of principal surfaces, a pair of side surfaces, and a pair of end faces, the stacked body being of a form of rectangular parallelepiped; a first grounding internal electrode including a rectangular first grounding electrode having a lead-out part led to one of the pair of side surfaces and a rectangular second grounding electrode having a lead-out part led to the other one of the pair of side surfaces, the rectangular first grounding electrode and the rectangular second grounding electrode being disposed side by side along the pair of side surfaces within one and a same plane in the stacked body; a second grounding internal electrode including a rectangular third grounding electrode which is positioned so as to overlap the first grounding electrode in a stacking direction, and has a lead-out part led to the other one of the pair of side surfaces, and a rectangular fourth grounding electrode which is positioned so as to overlap the second grounding electrode in the stacking direction, and has a lead-out part led to one of the pair of side surfaces, the rectangular third grounding electrode and the rectangular fourth grounding electrode being disposed side by side along the pair of side surfaces within one and a same plane in the stacked body; a rectangular first signal internal electrode disposed between the first grounding internal electrode and the second grounding internal electrode so as to confront the first grounding internal electrode and the second grounding internal electrode in the stacking direction, the rectangular first grounding electrode being led to at least one of the pair of end faces of the stacked body; first to fourth grounding external terminals which are each disposed on corresponding one of the pair of side surfaces of the stacked body and are connected with corresponding one of the lead-out parts, respectively, of the first to fourth grounding electrodes; and a pair of signal external terminals which are each disposed at corresponding one of the pair of end faces of the stacked body and are connected with the first signal internal electrode, the first grounding internal electrode having corners curved as seen in a plan view in the stacking direction, and the second grounding internal electrode having corners curved as seen in a plan view in the stacking direction, the corners of the first grounding internal electrode being at adjacent opposed sides of the rectangular first and second grounding electrodes, the corners being each located on an opposite side to the lead-out part of the rectangular first grounding electrode which is led to one of the pair of side surfaces and to the lead-out part of the rectangular second grounding electrode which is led to the other one of the pair of side surfaces, the corners of the second grounding internal electrode being at adjacent opposed sides of the rectangular third and fourth grounding electrodes, the corners being each located on an opposite side to the lead-out part of the rectangular third grounding electrode which is led to one of the pair of side surfaces and to the lead-out part of the rectangular fourth grounding electrode which is led to the other one of the pair of side surfaces.

Advantageous Effects of Invention

According to the multilayer capacitor pursuant to the invention, the grounding internal electrode is placed to constitute a path for passing electric current to a grounding end (ground), whereby equivalent series inductance (ESL) can be reduced.

BRIEF DESCRIPTION OF DRAWINGS

4(a) is a sectional view showing a first grounding internal electrode, FIG. 4(b) is a sectional view showing a signal internal electrode, and FIG. 4(c) is a sectional view showing a second grounding internal electrode;

FIG. 6(a) is a sectional view showing a first grounding internal electrode, and FIG. 6(b) is a sectional view showing a second grounding internal electrode;

FIG. 7(a) is a sectional view showing a first grounding internal electrode, and FIG. 7(b) is a sectional view showing a second grounding internal electrode;

FIG. 13(a) is a sectional view of the multilayer capacitor taken along a line corresponding to the line B-B shown in FIG. 9(a), and FIG. 13(b) is a sectional view of the multilayer capacitor taken along a line corresponding to the line D-D shown in FIG. 9(b);

FIG. 15(a) is a sectional view of the multilayer capacitor taken along a line corresponding to the line C-C shown in FIG. 9(a), and FIG. 15(b) is a sectional view of the multilayer capacitor taken along a line corresponding to the line E-E shown in FIG. 9(b);

DESCRIPTION OF EMBODIMENTS

Embodiment 1

Hereinafter, a multilayer capacitor 10 in accordance with Embodiment 1 of the invention will be described with reference to drawings.

Figure 1:
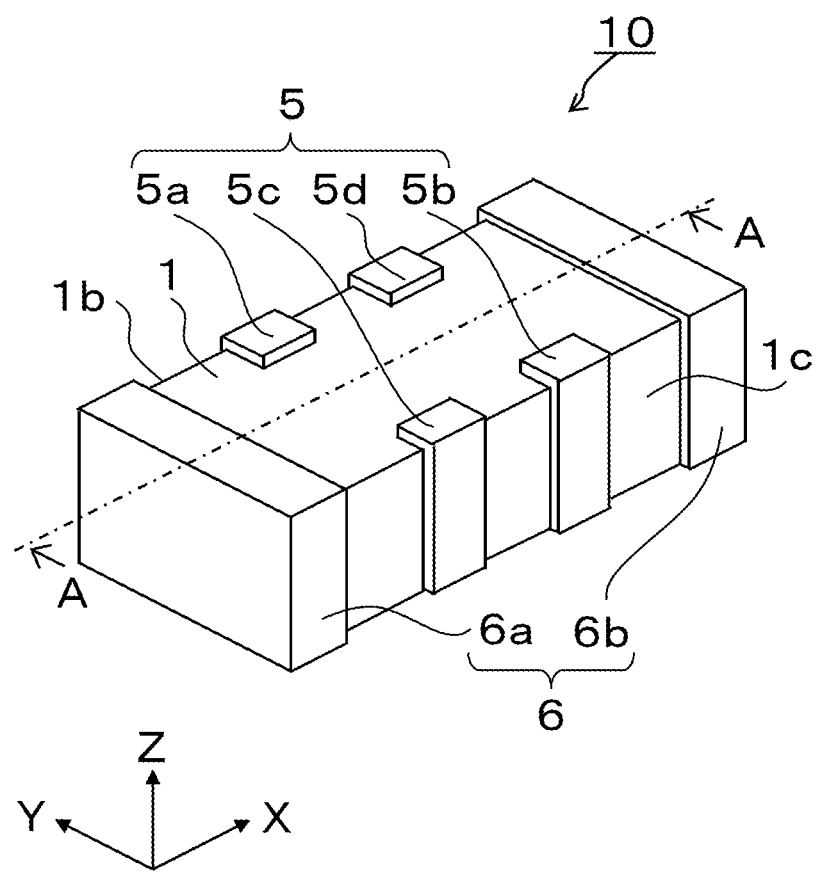
FIG. 1 is a schematic perspective view showing the multilayer capacitor in accordance with Embodiment 1.

FIG. 1 is a schematic perspective view showing the multilayer capacitor 10 in accordance with Embodiment 1 of the invention, and FIG. 2(a) is a sectional view of the multilayer capacitor 10 taken along the line A-A shown in FIG. 1. Moreover, in explaining the multilayer capacitor 10, for the sake of convenience, an X-Y-Z rectangular coordinate system is defined, and, the term "upper surface" or "lower surface" is used under the condition where a positive Z-axis direction corresponds to an upward direction. Note that like reference characters refer to like members or like parts throughout the drawings, and overlapping descriptions will be omitted.

As shown in FIGS. 1 to 4, the multilayer capacitor 10 comprises: a stacked body 1; a first grounding internal electrode 2 including a first grounding electrode 2a and a second grounding electrode 2b; a second grounding internal electrode 3 including a third grounding electrode 3a and a fourth grounding electrode 3b; a signal internal electrode 4; a grounding external terminal 5; and a signal external terminal 6.

Figure 4:
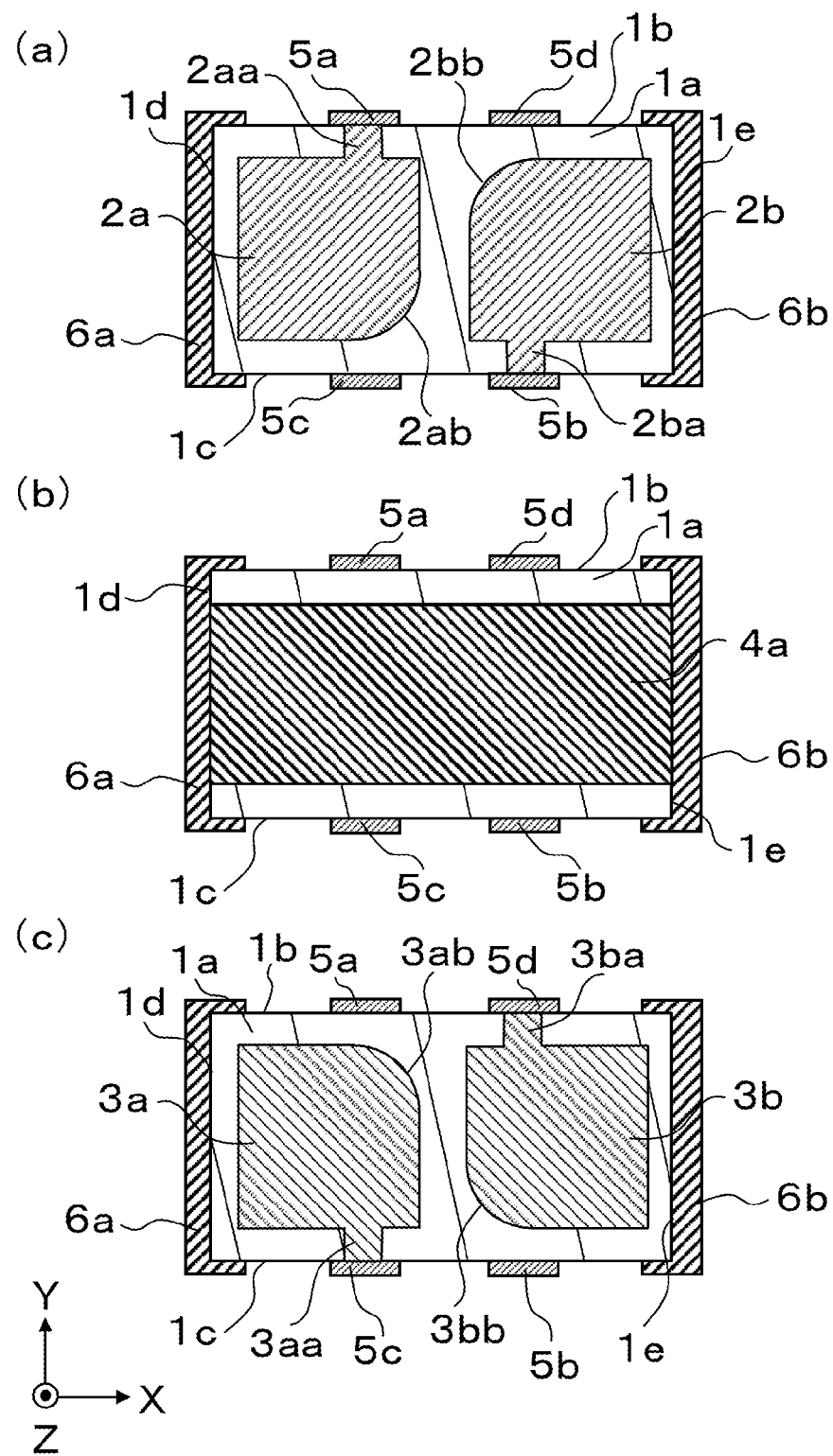
FIG. 4 is a sectional view of a stacked body as seen in a direction perpendicular to a stacking direction of the multilayer capacitor shown in FIG. 1, and more specifically FIG.

The stacked body 1, being of a form of a rectangular parallelepiped, which is composed of a stack of a plurality of dielectric layers 1a, is a sintered body obtained by firing a stack of a plurality of ceramic green sheets for forming the dielectric layers 1a. Thus, the stacked body 1 is shaped in a rectangular parallelepiped, and has a pair of principal surfaces constituted by confronting upper and lower faces, a pair of side surfaces constituted by confronting side surfaces 1b and 1c, and a pair of end faces constituted by confronting end faces 1d and 1e which are perpendicular to the side surfaces 1b and 1c. Moreover, in the stacked body 1, the plane of a section perpendicular to the direction of stacking the dielectric layers 1a (Z-axis direction), namely the X-Y plane, is rectangular-shaped as shown in FIG. 4.

Thus constructed, the multilayer capacitor 10 has a longitudinal length (a dimension in X-axis direction) of, for example, 0.6 (mm) to 2.2 (mm), has a transverse length (a dimension in Y-axis direction) of, for example, 0.3 (mm) to 1.5 (mm), and has a heightwise length (a dimension in Z-axis direction) of, for example, 0.3 (mm) to 1.2 (mm).

The dielectric layer 1a, which is rectangular-shaped as seen in a plan view, has a single-layer thickness of, for example, 0.5 (μm) to 3 (μm). For example, the stacked body 1 is composed of the plurality of dielectric layers 1a, ranging from layers to 1000 layers, stacked together in the Z-axis direction.

Figure 3:
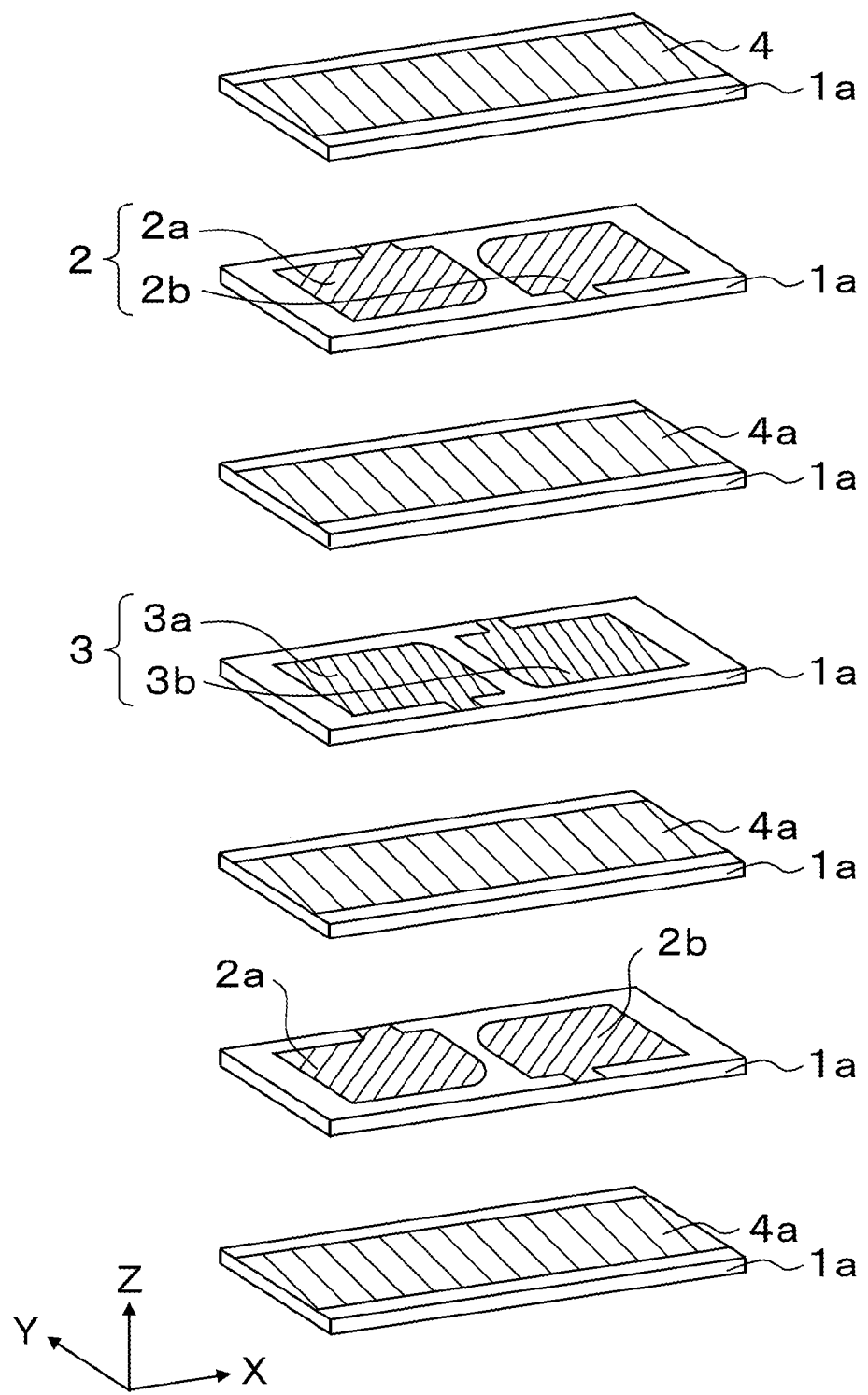
FIG. 3 is a schematic exploded perspective view of the multilayer capacitor shown in FIG. 1.

The first grounding internal electrode 2 is formed inside the stacked body 1. As shown in FIGS. 3 and 4, the first grounding internal electrode 2 includes the first grounding electrode 2a and the second grounding electrode 2b, and, the rectangular first grounding electrode 2a and the rectangular second grounding electrode 2b, taken as a pair, are disposed side by side along the pair of side surfaces 1b and 1c within one and the same plane perpendicular to the stacking direction in the stacked body 1. The first grounding electrode 2a has a lead-out part 2aa led to one side surface 1b, which is one of the pair of confronting side surfaces 1b and 1c of the stacked body 1. Moreover, the second grounding electrode 2b has a lead-out part 2ba led to the other side surface 1c, which is the other one of the pair of confronting side surfaces 1b and 1c of the stacked body 1. As used herein, the term "one and the same plane" is equivalent to one and the same inter-layer region, namely one and the same inter-dielectric layer 1a region.

Moreover, as shown in FIG. 4(a), the first grounding electrode 2a has a rectangular main electrode portion as seen in a plan view in the stacking direction. The lead-out part 2aa extends from a side of the rectangular main electrode portion which is located close to the side surface 1b to the side surface 1b, with its end led to the side surface 1b so as to be exposed at the side surface 1b. Similarly, as shown in FIG. 4(a), the second grounding electrode 2b has a rectangular main electrode portion as seen in a plan view in the stacking direction. The lead-out part 2ba extends from a side of the rectangular main electrode portion which is located close to the side surface 1c to the side surface 1c, with its end led to the side surface 1c so as to be exposed at the side surface 1c. The first grounding electrode 2a and the second grounding electrode 2b are disposed side by side so as to confront along the pair of side surfaces 1b and 1c at an interval, thus providing opposing areas located centrally of one and the same plane. Moreover, within one and the same plane, the first grounding electrode 2a and the second grounding electrode 2b are spaced apart by a distance of, for example, 20 (μm) to 200 (μm).

The second grounding internal electrode 3 is formed inside the stacked body 1. As shown in FIGS. 3 and 4, the second grounding internal electrode 3 includes the third grounding electrode 3a and the fourth grounding electrode 3b, and, the rectangular third grounding electrode 3a and the rectangular fourth grounding electrode 4b, taken as a pair, are disposed side by side along the pair of side surfaces 1b and 1c within one and the same plane perpendicular to the stacking direction in the stacked body 1. The third grounding electrode 3a is disposed so as to overlap the first grounding electrode 2a in the stacking direction, and has a lead-out part 3aa led to the other side surface 1c. Moreover, the fourth grounding electrode 3b is disposed so as to overlap the second grounding electrode 2b in the stacking direction, and has a lead-out part 3ba led to the one side surface 1b. Also, the term "one and the same plane" is equivalent to one and the same inter-layer region, namely one and the same inter-dielectric layer 1a region.

As shown in FIG. 4(c), the third grounding electrode 3a has a rectangular main electrode portion as seen in a plan view in the stacking direction. The lead-out part 3aa extends from a side of the rectangular main electrode portion which is located close to the side surface 1c to the side surface 1c, with its end led to the side surface 1c so as to be exposed at the side surface 1c. Similarly, as shown in FIG. 4(c), the fourth grounding electrode 3b has a rectangular main electrode portion as seen in a plan view in the stacking direction. The lead-out part 3ba extends from a side of the rectangular main electrode portion which is located close to the side surface 1b to the side surface 1b, with its end led to the side surface 1b so as to be exposed at the side surface 1b. The third grounding electrode 3a and the fourth grounding electrode 3b are disposed side by side so as to confront along the pair of side surfaces 1b and 1c at an interval, thus providing opposing areas located centrally of one and the same plane. Moreover, within one and the same plane, the third grounding electrode 3a and the fourth grounding electrode 3b are spaced apart by a distance of, for example, 20 (μm) to 200 (μm).

Thus, in the stacked body 1, as shown in FIGS. 3 and 4, in the stacking direction, the lead-out part 2aa of the first grounding electrode 2a and the lead-out part 3aa of the third grounding electrode 3a are led to the pair of confronting side surfaces 1b and 1c, respectively. Moreover, in the stacking direction, the lead-out part 2ba of the second grounding electrode 2b and the lead-out part 3ba of the fourth grounding electrode 3b are led to the pair of confronting side surfaces 1c and 1b, respectively. That is, the lead-out part 2aa is led to the side surface 1b, and the lead-out part 2ba is led to the side surface 1c opposed to the side surface 1b. Moreover, the lead-out part 3aa is led to the side surface 1c, and the lead-out part 3ba is led to the side surface 1b opposed to the side surface 1c.

An electrically conductive material, for example, a metal material such as nickel (Ni), copper (Cu), silver (Ag), palladium (Pd), or gold (Au), or an alloy material containing one or more of the described metal materials, such as a Ag—Pd alloy, is used for the first grounding internal electrode 2 and the second grounding internal electrode 3. It is preferable that the first to fourth grounding electrodes 2a to 3b are made of the same metal or alloy material. Moreover, the first grounding internal electrode 2 and the second grounding internal electrode 3 have a thickness of 0.5 (μm) to 2 (μm), for example.

Figure 2:
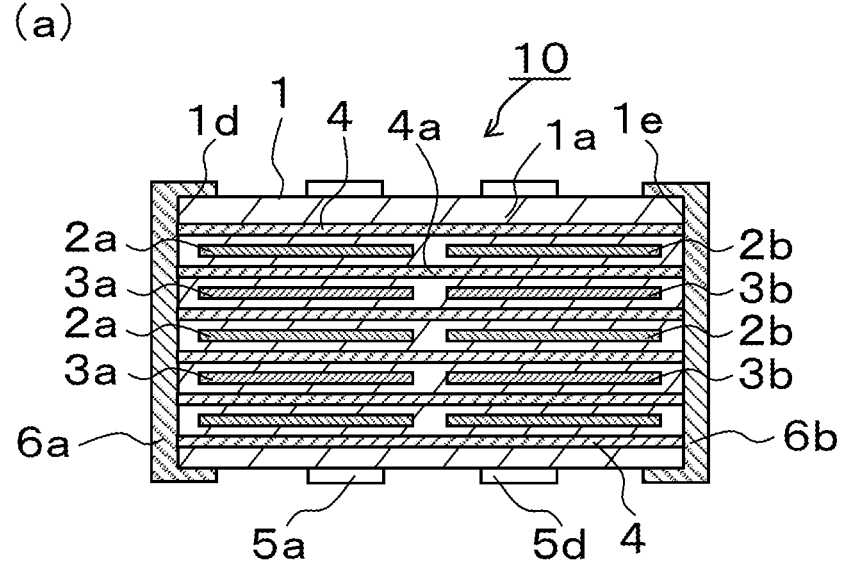
FIG. 2(a) is a sectional view of the multilayer capacitor shown in FIG. 1 taken along the line A-A.
FIG. 2(b) is a sectional view of another example of the multilayer capacitor shown in FIG. 1 taken along a line corresponding to the line A-A.
Figure 2:
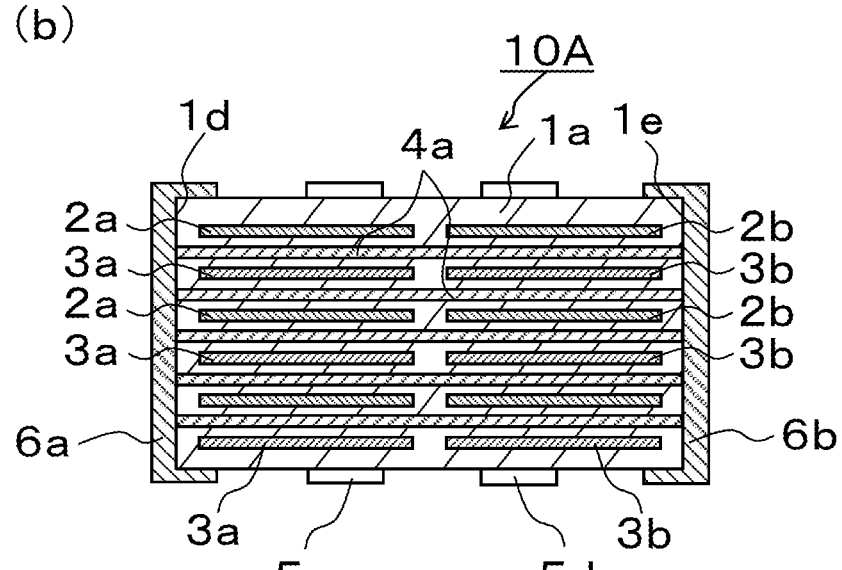
Figure 2:
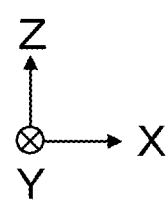

The signal internal electrode 4 is formed inside the stacked body 1. As shown in FIGS. 2 to 4, the signal internal electrode 4 is rectangular-shaped as seen in a plan view. A first signal internal electrode 4a is disposed between the first grounding internal electrode 2 and the second grounding internal electrode 3 so as to confront the first and second grounding internal electrodes 2 and 3 in the stacking direction, and is led to both of the pair of confronting end faces 1d and 1e of the stacked body 1. The first signal internal electrode 4a refers to one of the signal internal electrodes 4 that is located between the first grounding internal electrode 2 and the second grounding internal electrode 3. It is sufficient that the first signal internal electrode 4a be led to at least one of the pair of end faces 1d and 1e. In FIGS. 3 and 4, each end of the first signal internal electrode 4a in the X-axis direction is led to the corresponding one of the end faces 1d and 1e so as to be exposed at the corresponding end face. That is, the first signal internal electrode 4a in rectangular form is disposed inside the stacked body 1 so as to extend in the X-axis direction, with its ends in the X-axis direction exposed at the end faces 1d and 1e, respectively, as well as to terminate so as to be spaced from the side surfaces 1b and 1c.

An electrically conductive material, for example, a metal material such as nickel (Ni), copper (Cu), silver (Ag), palladium (Pd), or gold (Au), or an alloy material containing one or more of the described metal materials, such as a Ag—Pd alloy, is used for the signal internal electrode 4. It is preferable that all the signal internal electrodes 4 disposed inside the stacked body 1 are made of the same metal or alloy material. Moreover, the first signal internal electrode 4 has a thickness of 0.5 (μm) to (μm), for example.

Moreover, it is preferable that the first grounding internal electrode 2, the second grounding internal electrode 3, and the signal internal electrode 4 are made of the same metal or alloy material.

In the multilayer capacitor 10, as shown in FIGS. 2(a) and 3, the signal internal electrode 4, the first grounding internal electrode 2, the first signal internal electrode 4a, and the second grounding internal electrode 3 are successively disposed in the order presented from the positive side to the negative side in the Z-axis direction within the stacked body 1. Each dielectric layer 1a lies between the corresponding internal electrodes. That is, the first grounding internal electrode 2, the first signal internal electrode 4a, and the second grounding internal electrode 3 are disposed so as to confront one another, while being separated from one another by the dielectric layer 1a, within the stacked body 1, and, at least one dielectric layer 1a is interposed between the corresponding internal electrodes. A stack of the plurality of dielectric layers 1a formed with the internal electrodes constitutes the stacked body 1 serving as the main body of the multilayer capacitor 10. In this way, in the multilayer capacitor 10, as shown in FIG. 2, the first grounding internal electrodes 2 and the second grounding internal electrodes 3 are alternately disposed, with the first signal internal electrode 4a interposed between the corresponding grounding internal electrodes, within the stacked body 1.

Moreover, in FIGS. 2(a) and 3, in the multilayer capacitor 10, the signal internal electrode 4, the first grounding internal electrode 2, the first signal internal electrode 4a, and the second grounding internal electrode 3 are successively disposed in the order presented from the positive side to the negative side in the Z-axis direction, and, the outermost internal electrode layers (internal electrodes located close to the top and the bottom, respectively, of the construction) in the Z-axis direction are each constituted by the signal internal electrode 4. Note that the multilayer capacitor 10 is not limited to the laminated structure as shown in FIG. 2(a). The number of the signal internal electrodes 4, the number of the first grounding internal electrodes 2, and the number of the second grounding internal electrodes 3 are suitably determined with consideration given to the characteristics of the multilayer capacitor 10 and so forth.

Moreover, as shown in FIG. 2(b), in a laminated structure that exemplifies a multilayer capacitor 10A, the first grounding internal electrode 2, the first signal internal electrode 4a, and the second grounding internal electrode 3 are successively disposed in the order presented from the positive side to the negative side in the Z-axis direction, and, the outermost internal electrode layer at the top side in the Z-axis direction is constituted by the first grounding internal electrode 2, and, the outermost internal electrode layer at the bottom side in the Z-axis direction is constituted by the second grounding internal electrode 3. In the multilayer capacitor 10A, the first grounding internal electrode 2 and the second grounding internal electrode 3 are placed as the top outermost internal electrode layer and the bottom outermost internal electrode layer, respectively. Since the first grounding internal electrode 2 and the second grounding internal electrode 3 block, for example, an external electric field, it is possible to attain enhanced shielding capability.

In the multilayer capacitor 10A, by the placement of the first grounding internal electrode 2 and the second grounding internal electrode 3 as the top outermost internal electrode layer and the bottom outermost internal electrode layer, respectively, shielding capability can be attained, thus reducing the influence of noise such for example as noise which is over the limit of input noise immunity or disturbance noise resulting from electrostatic discharge.

Moreover, in the multilayer capacitor 10A, the top outermost internal electrode layer in the Z-axis direction may be constituted by the second grounding internal electrode 3, and the bottom outermost internal electrode layer in the Z-axis direction may be constituted by the first grounding internal electrode 2.

As shown in FIG. 1, first to fourth grounding external terminals 5a to 5d are each placed on the corresponding one of the pair of confronting side surfaces 1b and 1c of the stacked body 1. More specifically, the first grounding external terminal 5a and the fourth grounding external terminal 5d are placed on the side surface 1b, and, the second grounding external terminal 5b and the third grounding external terminal 5c are placed on the side surface 1c. Each of the first to fourth grounding external terminals 5a to 5d has its ends extended over the upper and lower surfaces, respectively, of the stacked body 1. Moreover, electrical connection may be established between the first grounding external terminal 5a and the third grounding external terminal 5c, as well as between the second grounding external terminal 5b and the fourth grounding external terminal 5d. For example, the first grounding external terminal 5a and the third grounding external terminal 5c, as well as the second grounding external terminal 5b and the fourth grounding external terminal 5d, may be connected together either at one of the upper and lower surfaces of the stacked body 1 or at both of the upper and lower surfaces thereof.

As shown in FIG. 4, the first grounding external terminal 5a is connected to the lead-out part 2aa of the first grounding electrode 2a, and, the second grounding external terminal 5b is connected to the lead-out part 2ba of the second grounding electrode 2b. Moreover, the third grounding external terminal 5c is connected to the lead-out part 3aa of the third grounding electrode 3a, and, the fourth grounding external terminal 5d is connected to the lead-out part 3ba of the fourth grounding electrode 3b.

The first grounding external terminal 5a is disposed so as to cover a part of the lead-out part 2aa which is exposed at the side surface 1b, and, the second grounding external terminal 5b is disposed so as to cover a part of the lead-out part 2ba which is exposed at the side surface 1c. Moreover, the third grounding external terminal 5c is disposed so as to cover a part of the lead-out part 3aa which is exposed at the side surface 1c, and, the fourth grounding external terminal 5d is disposed so as to cover a part of the lead-out part 3ba which is exposed at the side surface 1b.

Moreover, for example, the first to fourth grounding external terminals 5a to 5d are each connected to a grounding pad located on a circuit board (not shown in the drawings) on which the multilayer capacitor 10 is mounted.

A pair of the signal external terminals 6 is constituted by a first signal external terminal 6a and a second signal external terminal 6b opposed to each other. The first signal external terminal 6a and the second signal external terminal 6b are disposed at the end face 1d and the end face 1e, respectively, and are connected with the signal internal electrode 4. As shown in FIG. 1, the first signal external terminal 6a is disposed so as to cover the entire end face 1d, and, the second signal external terminal 6b is disposed so as to cover the entire end face 1e.

Moreover, the pair of signal external terminals 6 are connected to, for example, a signal line electrode or a current line electrode situated on a circuit board (not shown) on which the multilayer capacitor 10 is mounted.

In the multilayer capacitor 10, the signal internal electrode 4 is placed so as to extend in the X-axis direction (extend across the end faces 1d and 1e), and, the signal internal electrode 4 constitutes a path for signal transmission.

Moreover, in the multilayer capacitor 10, the first grounding internal electrode 2 and the second grounding internal electrode 3 are disposed, with the first signal internal electrode 4a interposed in between, in the Z-axis direction (stacking direction), and, the lead-out parts 2aa, 2ba, 3aa, and 3ba extend to the side surface 1b or the side surface 1c. In the multilayer capacitor 10, the lead-out parts 2aa, 2ba, 3aa, and 3ba are connected to the first to fourth grounding external terminals 5a to 5d, respectively, and, the first grounding internal electrode 2 and the second grounding internal electrode 3 constitute a path for the flow of electric current to ground.

Thus, in the multilayer capacitor 10, the first to fourth grounding electrodes 2a to 3b are disposed inside the stacked body 1, and, electric current flows to ground through four paths defined by the first to fourth grounding electrodes 2a to 3b. The multilayer capacitor 10 having the four paths leading to ground enables mutual inductances to cancel each other out.

Moreover, in the multilayer capacitor 10, the signal internal electrode 4 and the first grounding internal electrode 2, as well as the signal internal electrode 4 and the second grounding internal electrode 3, form capacitance in the stacking direction within the stacked body 1.

In the multilayer capacitor 10, the first signal internal electrode 4a is held between the first grounding internal electrode 2 and the second grounding internal electrode 3, and, the first grounding internal electrode 2 and the second grounding internal electrode 3 are of the same polarity. Moreover, in the multilayer capacitor 10, the first grounding electrode 2a and the third grounding electrode 3a are disposed so as to overlap each other in the stacking direction, and, the second grounding electrode 2b and the fourth grounding electrode 3b are disposed so as to overlap each other in the stacking direction. In the multilayer capacitor 10, since the lead-out part 2aa is led to the side surface 1b and the lead-out part 3aa is led to the side surface 1c opposed to the side surface 1b, and also the lead-out part 2ba is led to the side surface 1c and the lead-out part 3ba is led to the side surface 1b opposed to the side surface 1c, it follows that electric currents in, respectively, the first grounding internal electrode 2 and the second grounding internal electrode 3 disposed in the stacking direction (Z-axis direction) flow in opposite directions.

Also in the first grounding internal electrodes 2 located within one and the same plane, since the lead-out part 2aa is led to the side surface 1b and the lead-out part 2ba is led to the side surface 1c opposed to the side surface 1b, it follows that electric currents in, respectively, the first grounding electrode 2a and the second grounding electrode 2b disposed adjacent each other flow in opposite directions. Similarly, also in the second grounding internal electrodes 3 located within one and the same plane, since the lead-out part 3aa is led to the side surface 1c and the lead-out part 3ba is led to the side surface 1b opposed to the side surface 1c, it follows that electric currents in, respectively, the third grounding electrode 3a and the third grounding electrode 3b disposed adjacent each other flow in opposite directions.

Thus, in the multilayer capacitor 10, the first grounding electrode 2a and the second grounding electrode 2b are disposed within the (X-Y) plane, with the lead-out part 2aa and the lead-out part 2ba positioned so that the electric currents in the first and second grounding electrodes flow in opposite directions. That is, in these electrodes, the directions of current flow path leading to ground become opposite to each other, and the directions of magnetic field generation become opposite to each other correspondingly. This makes it possible to reduce equivalent series inductance (ESL) under mutual induction effects. Moreover, in the multilayer capacitor 10, similarly, the third grounding electrode 3a and the fourth grounding electrode 3b are disposed within the (X-Y) plane, with the lead-out part 3aa and the lead-out part 3ba positioned so that the electric currents in the third and fourth grounding electrodes flow in opposite directions. That is, in these electrodes, the directions of current flow path leading to ground become opposite to each other, and the directions of magnetic field generation become opposite to each other correspondingly. This makes it possible to reduce equivalent series inductance (ESL) under mutual induction effects.

Moreover, in the multilayer capacitor 10, the first grounding electrode 2a and the third grounding electrode 3a are disposed so as to overlap each other in the stacking direction (Z-axis direction), with the lead-out part 2aa and the lead-out part 3aa positioned so that the electric currents in the first and third grounding electrodes flow in opposite directions. That is, in these electrodes, the directions of current flow path leading to ground become opposite to each other, and the directions of magnetic field generation become opposite to each other correspondingly. This makes it possible to reduce equivalent series inductance (ESL) under mutual induction effects. Moreover, in the multilayer capacitor 10, similarly, the second grounding electrode 2b and the fourth grounding electrode 3b are disposed so as to overlap each other in the stacking direction (Z-axis direction), with the lead-out part 2ba and the lead-out part 3ba positioned so that the electric currents in the second and fourth grounding electrodes flow in opposite directions. That is, in these electrodes, the directions of current flow path leading to ground become opposite to each other, and the directions of magnetic field generation become opposite to each other correspondingly. This makes it possible to reduce equivalent series inductance (ESL) under mutual induction effects.

Moreover, as shown in FIG. 4, the first grounding internal electrode 2 and the second grounding internal electrode 3, each having a rectangular main electrode portion as seen in a plan view in the stacking direction, are placed so that their main electrode portions are disposed adjacent each other in a direction perpendicular to the stacking direction (X-axis direction). In the first grounding internal electrode 2 and the second grounding internal electrode 3, the first grounding electrode 2a and the second grounding electrode 2b have, at their adjacent opposed sides, corners 2ab and 2bb, respectively, which are each shaped as a curved corner, and, the third grounding electrode 3a and the fourth grounding electrode 3b have, at their adjacent opposed sides, corners 3ab and 3bb, respectively, which are each shaped as a curved corner.

More specifically, of the corners at the adjacent opposed sides of the first grounding electrode 2a and the second grounding electrode 2b, the corner 2ab of the first grounding electrode 2a is located on an opposite side to the lead-out part 2aa, and the corner 2bb of the second grounding electrode 2b is located on an opposite side to the lead-out part 2ba, and, in the first grounding electrode 2a and the second grounding electrode 2b as seen in a plan view in the stacking direction, the corner 2ab located on the side opposite to the lead-out part 2aa led to the corresponding one of the pair of side surfaces 1b and 1c and the corner 2bb located on the side opposite to the lead-out part 2ba led to the corresponding one of the pair of side surfaces 1b and 1c are each shaped as a curved corner. As used herein, the curved corner is construed as encompassing a rounded corner.

Moreover, of the corners at the adjacent opposed sides of the third grounding electrode 3a and the fourth grounding electrode 3b, the corner 3ab of the third grounding electrode 3a is located on an opposite side to the lead-out part 3aa, and the corner 3bb of the fourth grounding electrode 3b is located on an opposite side to the lead-out part 3ba, and, in the third grounding electrode 3a and the fourth grounding electrode 3b as seen in a plan view in the stacking direction, the corner 3ab located on the side opposite to the lead-out part 3aa led to the corresponding one of the pair of side surfaces 1b and 1c and the corner 3bb located on the side opposite to the lead-out part 3ba led to the corresponding one of the pair of side surfaces 1b and 1c are each shaped as a curved corner. As used herein, the curved corner is construed as encompassing a rounded corner.

Thus, in the first grounding internal electrode 2 and the second grounding internal electrode 3, as seen in a plan view in the stacking direction, the corners 2ab, 2bb, 3ab, and 3bb are each rounded off, and are located on the sides opposite to the lead-out parts 2aa, 2ba, 3aa, and 3ba, respectively, which are each led to the corresponding one of the pair of side surfaces 1b and 1c.

Moreover, in the first grounding internal electrode 2 and the second grounding internal electrode 3, the corners 2*ab*, 2*bb*, 3*ab*, and 3*bb* may be curved on a radius of curvature of 50 (μm) to 300 (μm), for example.

As described above, in the multilayer capacitor 10, in the stacking direction (Z-axis direction), electric currents in, respectively, the first grounding internal electrode 2 and the second grounding internal electrode 3 flow in opposite directions. Moreover, in one and the same plane, electric currents in, respectively, the first grounding electrode 2*a* and the second grounding electrode 2*b*, as well as electric currents in, respectively, the third grounding electrode 3*a* and the fourth grounding electrode 3*b*, flow in opposite directions. This enables magnetic-field cancellation effects to be produced in the stacked body 1. Moreover, in the first grounding internal electrode 2 and the second grounding internal electrode 3, as seen in a plan view in the stacking direction, the neighboring corners, namely the corners 2*ab* and 2*bb* located on the sides opposite to the lead-out parts 2*aa* and 2*ba*, respectively, and the corners 3*ab* and 3*bb* located on the sides opposite to the lead-out parts 3*aa* and 3*ba*, respectively, are each shaped as a curved corner.

For example, in high-frequency ranges, electric current flows through the first grounding internal electrode 2 and the second grounding internal electrode 3 with a high degree of linearity. For example, when each of the first grounding internal electrode 2 and the second grounding internal electrode 3 has a rectangular shape formed with 90° corners, reflection is likely to occur at the right-angled corner located in a path for current transmission, which results in interactions of reflected waves and incident waves of noise components. Moreover, the higher the frequency level, the likelier it becomes that reflection will occur. The right-angled corner is prone to an increase in current density due to distortion in current waveform caused by reflection, and, the flow of noise component current is obstructed under the increased current density, wherefore the noise component current cannot be readily passed to a grounding end (ground). After all, noise component reduction will be difficult.

In this regard, in the multilayer capacitor 10, since the corners 2*ab*, 2*bb*, 3*ab*, and 3*bb* are each shaped as a curved corner, it is possible to suppress reflection and an ensuing increase in current density, and thereby reduce the likelihood of distortion in the waveform of noise component current, as well as the likelihood of attenuation of incident waves of noise components. Accordingly, in the multilayer capacitor 10, noise component current flows smoothly toward the lead-out parts 2*aa*, 2*ba*, 3*aa*, and 3*ba*, and are hence readily passed to the grounding end (ground), wherefore noise components can be reduced.

In this way, the multilayer capacitor 10 is capable of reducing equivalent series inductance (ESL) under the magnetic-field cancellation effects. Thus, the multilayer capacitor 10 which is of reduced equivalent series inductance (ESL) allows for a shift of resonance frequency to the high-frequency side, and hence achieves noise reduction in high-frequency ranges.

For example, when the multilayer capacitor 10 of Embodiment is connected to a signal line or a power supply line of a circuit board (not shown), the first signal external terminal 6*a* is connected to the input end of the signal line or power supply line, and the second signal external terminal 6*b* is connected to the output end of the signal line or power supply line, and also, the first to fourth grounding external terminals 5*a* to 5*d* are each connected to the grounding end (ground). In this way, noise can be reduced in the signal line or power supply line in high-frequency ranges. In this case, for example, the pattern of the signal line or power supply line that it is desired that noise be reduced is cut so that the multilayer capacitor 10 may be connected, at its first and second signal external terminals 6*a* and 6*b*, connected with the cuts.

Moreover, with the reduced equivalent series inductance (ESL), likewise, by connecting the multilayer capacitor 10 to, for example, a drive power supply line or a signal line of CPU, it is possible to reduce noise in the drive power supply line in high-frequency ranges. For example, in the multilayer capacitor 10, the first signal external terminal 6*a* and the second signal external terminal 6*b* are connected in parallel with the power supply line or signal line on the circuit board (at the same potential on the circuit), and also the first to fourth grounding external terminals 5*a* to 5*d* are each connected to the grounding end (ground). In this way, noise can be reduced in the power supply line or signal line in high-frequency ranges. In this case, for example, the pattern of the power supply line or signal line that it is desired that noise be reduced is not cut, and, the multilayer capacitor 10 is set, with its first and second signal external terminals 6*a* and 6*b* connected in parallel with the power supply line or signal line.

Figure 5:
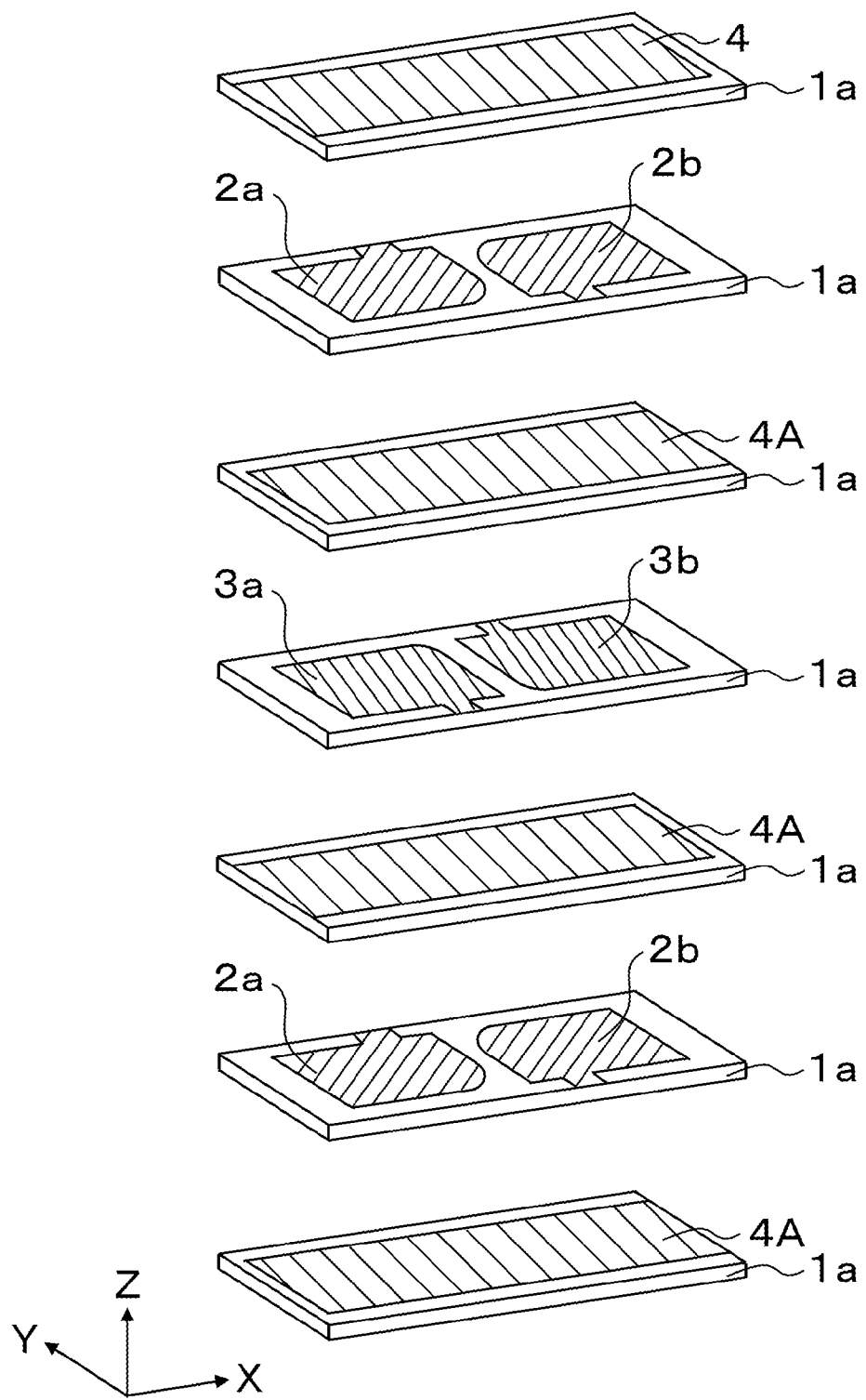
FIG. 5 is a schematic exploded perspective view of another example of the multilayer capacitor of Embodiment 1.

Moreover, the multilayer capacitor 10 may be designed so that the signal internal electrode 4, which is rectangular-shaped as seen in a plan view as shown in FIG. 5, is formed inside the stacked body 1 so as to lie between the first grounding internal electrode 2 and the second grounding internal electrode 3 while being led to at least one of the pair of confronting end faces 1*d* and 1*e* of the stacked body 1. That is, in FIG. 5, first signal internal electrodes 4A are disposed inside the stacked body 1 so as to extend in the X-axis direction, with their alternate ends in the X-axis direction exposed at the corresponding end faces 1*d* and 1*e*, as well as to terminate so as to be spaced from the side surfaces 1*b* and 1*c*.

When connecting the multilayer capacitor 10 so constructed to, for example, a signal line or a power supply line of a circuit board (not shown), the first signal external terminal 6*a* and the second signal external terminal 6*b* are connected onto the signal line or power supply line, and also the first to fourth grounding external terminals 5*a* to 5*d* are each connected to the grounding end (ground). This makes it possible to reduce noise in the signal line or power supply line in high-frequency ranges. In this case, for example, the pattern of the power supply line or signal line that noise reduction is desired is not cut, and, the first signal external terminal 6*a* and the second signal external terminal 6*b* are connected onto the line pattern.

Moreover, in setting the multilayer capacitor 10 so constructed, for example, the first signal external terminal 6*a* and the second signal external terminal 6*b* are connected in parallel with the power supply line or signal line on the circuit board (at the same potential on the circuit), and the first to fourth grounding external terminals 5*a* to 5*d* are connected to the grounding end (ground). This also makes it possible to reduce noise in the power supply line or signal line in high-frequency ranges. In this case, for example, the pattern of the power supply line or signal line that noise reduction is desired is not cut, and, the first signal external terminal 6*a* and the second signal external terminal 6*b* are connected in parallel with the power supply line.

Figure 17:
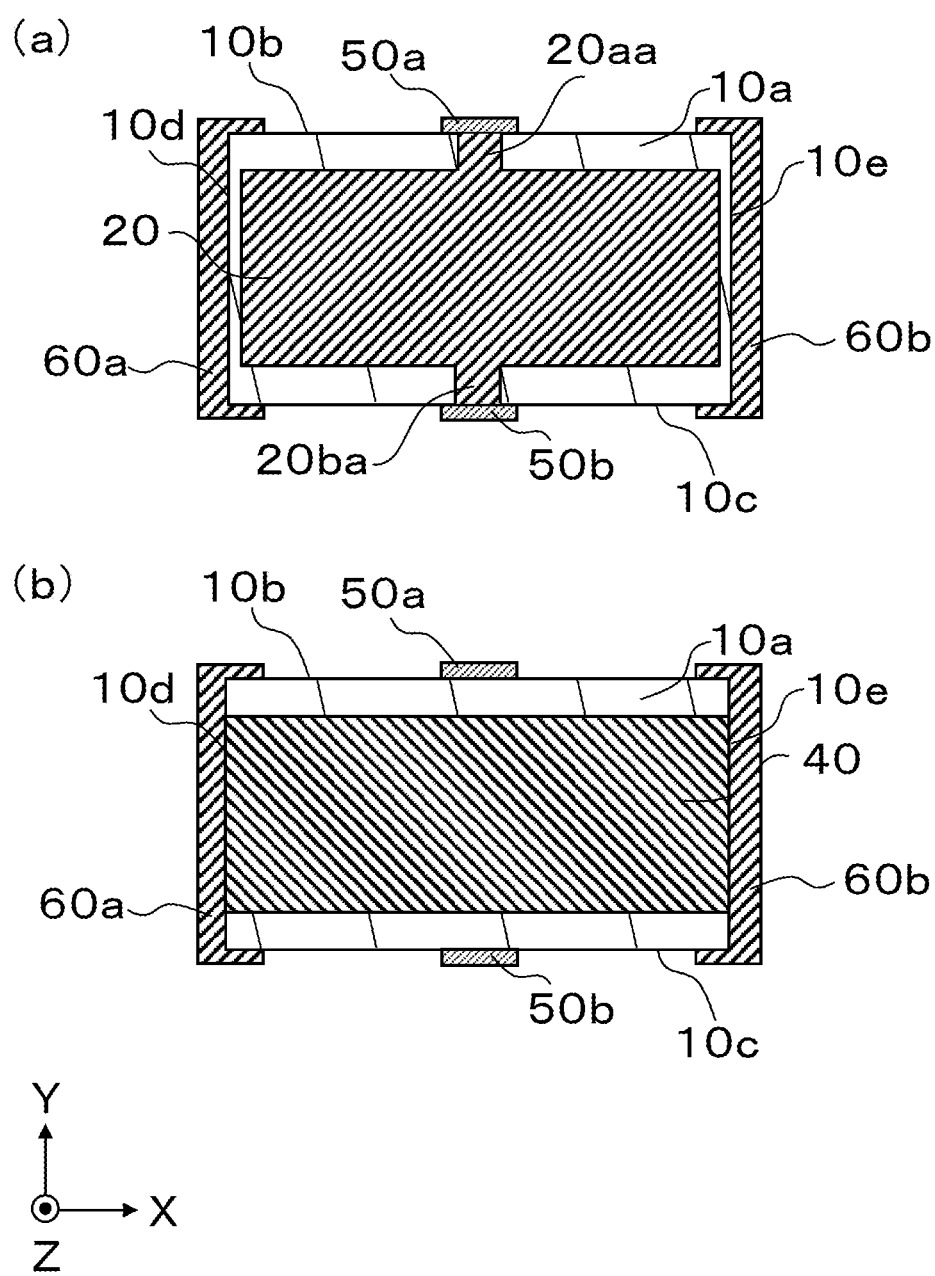
FIG. 17 is an explanatory view for explaining the internal electrode structure of a conventional multilayer capacitor.

The following describes the attenuation characteristics of the multilayer capacitor 10 with reference to drawings. For purposes of comparison, in addition to the multilayer capacitor of Embodiment 1 (hereafter referred to as "Example 1"), a multilayer capacitor having an internal electrode structure as shown in FIG. 17 is prepared as a conventional example. This conventional multilayer capacitor will be described first.

As shown in FIG. 17, the conventional multilayer capacitor comprises: a stacked body which is composed of a stack of a plurality of dielectric layers 10a and is shaped in a rectangular parallelepiped; a grounding internal electrode 20, disposed in corresponding one and the same plane within the stacked body, having a lead-out part 20aa led to one side surface 10b, which is one of pair of confronting side surfaces of the stacked body, and a lead-out part 20ba led to the other side surface 10c; a signal internal electrode 40 placed between the grounding internal electrodes 20 in the stacking direction while being led to pair of confronting end faces 10d and 10e of the stacked body; first and second grounding external terminals 50a and 50b which are placed on the pair of confronting side surfaces 10b and 10c, respectively, of the stacked body and are connected with the corresponding grounding internal electrodes 20; and signal external terminals 60a and 60b which are placed on the pair of confronting end faces 10d and 10e, respectively, of the stacked body and are connected with the signal internal electrode 40. Thus, the conventional multilayer capacitor differs from the multilayer capacitor 10 of Example 1 in the structure of the grounding internal electrode 20.

Figure 8:
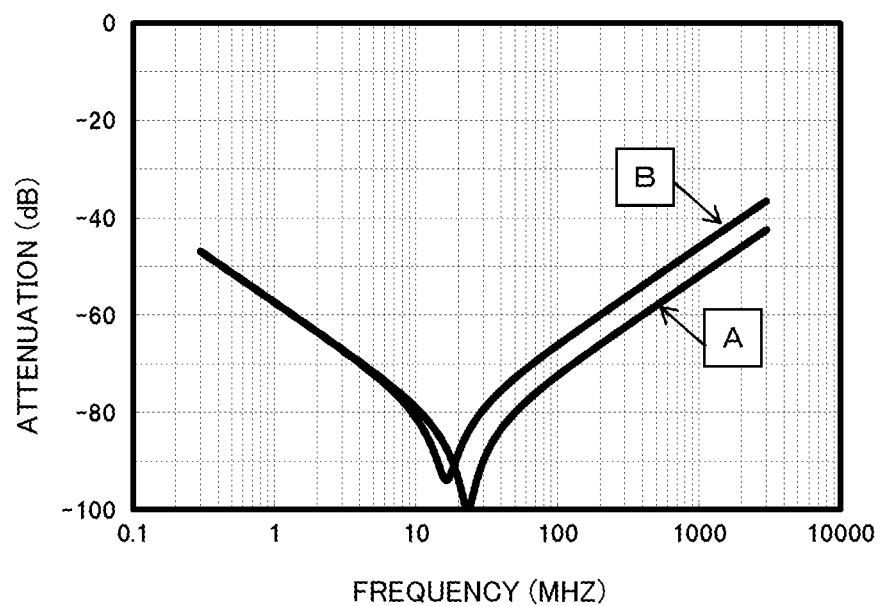
FIG. 8 is a chart showing a graph representing the attenuation characteristics of the multilayer capacitor shown in FIG. 1.

In FIG. 8, there are shown a characteristic curve A indicative of the attenuation characteristics of the multilayer capacitor 10 of Example 1 and a characteristic curve B indicative of the attenuation characteristics of the conventional multilayer capacitor. For example, at a frequency of 100 (MHz) laid off as an abscissa in the graph shown in FIG. 8, the characteristic curve B corresponding to the conventional example represents attenuation of about −66 (dB), whereas the characteristic curve A corresponding to Example 1 represents attenuation of about −72 (dB). As to attenuation characteristics at 100 (MHz), the amount of attenuation in the multilayer capacitor 10 of Example 1 is 6 (dB) greater than the amount of attenuation in the conventional multilayer capacitor. Note that the conventional multilayer capacitor and the multilayer capacitor of Example 1 have dimensions of 1.0 (mm) by 0.5 (mm) by 0.5 (mm) high.

Moreover, equivalent series inductance (ESL) in the conventional example is 60 (pH), whereas ESL in Example 1 is 50 (pH). That is, in point of ESL reduction, the multilayer capacitor 10 of Example 1 is superior to the conventional multilayer capacitor. The conventional multilayer capacitor exhibits capacitance of 4.7 (μF) and equivalent series resistance (ESR) of 2.5 (mΩ)). On the other hand, the multilayer capacitor 10 of Example 1 exhibits capacitance of 4.7 (μF) and equivalent series resistance (ESR) of 2.3 (mΩ)).

Thus, the multilayer capacitor 10 which is of reduced equivalent series inductance (ESL) allows for a shift of resonance frequency to the high-frequency side, and hence achieves noise reduction in high-frequency ranges.

The following describes an example of methods for manufacturing the multilayer capacitor 10 shown in FIG. 1.

There are prepared a plurality of first to third ceramic green sheets. The first ceramic green sheet is intended to be formed with the first grounding internal electrode 2, the second ceramic green sheet is intended to be formed with the second grounding internal electrode 3, and the third ceramic green sheet is intended to be formed with the signal internal electrode 4.

In the plurality of first ceramic green sheets, to form the first grounding internal electrode 2 comprising the first grounding electrode 2a and the second grounding electrode 2b, the patterns of the first grounding internal electrode 2 are disposed at predetermined spacing on one and the same plane, and, a conductor paste layer for the first grounding internal electrode 2 is formed of a conductor paste for forming the first grounding internal electrode 2. To obtain numbers of the multilayer capacitors 10, the plurality of first grounding internal electrodes 2 are formed in a single first ceramic green sheet. Moreover, the conductor paste layer for the first grounding internal electrode 2 is formed so that the first grounding internal electrodes 2 may have curved corners 2ab and 2bb as seen in a plan view in the stacking direction.

Moreover, in the plurality of second ceramic green sheets, to form the second grounding internal electrode 3 comprising the third grounding electrode 3a and the fourth grounding electrode 3b, the patterns of the second grounding internal electrode 3 are disposed at predetermined spacing on one and the same plane, and, a conductor paste layer for the second grounding internal electrode 3 is formed of a conductor paste for forming the second grounding internal electrode 3. To obtain numbers of the multilayer capacitors 10, the plurality of second grounding internal electrodes 3 are formed in a single second ceramic green sheet. Moreover, the conductor paste layer for the second grounding internal electrode 3 is formed so that the second grounding internal electrodes 2 may have curved corners 3ab and 3bb as seen in a plan view in the stacking direction.

Moreover, in the plurality of third ceramic green sheets, to form the signal internal electrode 4, the patterns of the signal internal electrode 4 are disposed at predetermined spacing on one and the same plane, and, a conductor paste layer for the signal internal electrode 4 is formed of a conductor paste for forming the signal internal electrode 4. To obtain numbers of the multilayer capacitors 10, the plurality of signal internal electrodes 4 are formed in a single third ceramic green sheet.

The conductor paste layer for each of the first and second grounding internal electrodes 2 and 3 and the conductor paste layer for the signal internal electrode 4 as above described are formed by printing the corresponding conductor pastes in predetermined patterns onto the corresponding ceramic green sheets by screen printing technique, for example. Moreover, screen-printing plates have rounded corners to obtain curved corners 2ab, 2bb, 3ab, and 3bb, wherefore the first grounding internal electrode 2 and the second grounding internal electrode 3 can be configured to have curved corners 2ab, 2bb, 3ab, and 3bb with use of the screen-printing plates having rounded corners.

The first to third ceramic green sheets constitute the dielectric layers 1a, the conductor paste layer for the first grounding internal electrode 2 constitutes the first grounding internal electrode 2, the conductor paste layer for the second grounding internal electrode 3 constitutes the second grounding internal electrode 3, and the conductor paste layer for the signal internal electrode 4 constitutes the signal internal electrode 4.

The ceramic green sheet which forms the dielectric layer 1a is made of a material composed predominantly of dielectric ceramics such for example as $BaTiO_3$, $CaTiO_3$, $SrTiO_3$, or $CaZrO_3$, or, alternatively, may be made of the described material with, for example, a Mn compound, a Fe compound, a Cr compound, a Co compound, or a Ni compound added as a secondary constituent.

The first to third ceramic green sheets are obtained by admixing a suitable organic solvent or the like in powder of a raw dielectric ceramic material and an organic binder to prepare a ceramic slurry, and subsequently molding the slurry into sheet form by doctor blade technique or other means.

The first grounding internal electrode 2-forming conductor paste, the second grounding internal electrode 3-forming conductor paste, and the signal internal electrode 4-forming conductor paste are prepared by adding an additive (dielectric material), a binder, a solvent, a dispersant, and so forth to the earlier described corresponding internal electrode-forming conductor materials (metal materials) in powdery form, and subsequently kneading the mixture thus obtained. Examples of the internal electrode-forming conductive materials include a metal material such as nickel (Ni), copper (Cu), silver (Ag), palladium (Pd), or gold (Au), and an alloy material containing one or more of the described metal materials, such as a Ag—Pd alloy. It is preferable that the first grounding internal electrode 2, the second grounding internal electrode 3, and the signal internal electrode 4 are made of the same metal or alloy material.

For example, to obtain a structure as shown in FIG. 3, the third ceramic green sheet, the first ceramic green sheet, the third ceramic green sheet, the second ceramic green sheet, the third ceramic green sheet, the first ceramic green sheet, and the third ceramic green sheet are laminated one after another in the order presented. Then, an internal electrode-free ceramic green sheet is laminated on each outermost layer of the stack in the Z-axis direction. Thus, there is provided a stacked body having a structure as shown in FIG. 3.

The first to third ceramic green sheets thus stacked are pressed together into a single-piece construction, forming a raw stacked body of large size including numbers of raw stacked bodies 1. This large-size raw stacked body is cut up to obtain the raw stacked bodies 1, each of which will constitute the stacked body 1 of the multilayer capacitor 10 shown in FIG. 1. For example, a dicing blade may be used to cut up the large-size raw stacked body.

The stacked body 1 is obtained by firing the raw stacked body 1 at a temperature of 800 (° C.) to 1300 (° C.), for example. In the course of this process, the plurality of first to third ceramic green sheets become the dielectric layers 1a, the first-grounding-internal-electrode conductor paste layer becomes the first grounding internal electrode 2, the second-grounding-internal-electrode conductor paste layer becomes the second grounding internal electrode 3, and the signal-internal-electrode conductor paste layer becomes the signal internal electrode 4. Moreover, the stacked body 1 has its corners or sides rounded off by grinding means such for example as barrel finishing. The stacked body 1 having rounded corners or rounded sides is resistant to chipping at its corners or sides.

Next, to form the signal external terminal 6, for example, a signal external terminal 6-forming conductive paste that constitutes the signal external terminal 6 is applied to the end faces 1d and 1e of the stacked body 1, and is then baked out. The signal external terminal 6-forming conductive paste is prepared by adding a binder, a solvent, a dispersant, and so forth to powder of the metal material of construction of the signal external terminal 6 as above described, and subsequently kneading the mixture thus obtained.

Moreover, to form the grounding external terminal 5, for example, a grounding external terminal 5-forming conductive paste that constitutes the grounding external terminal 5 is applied to the side surfaces 1b and 1c of the stacked body 1, and is then baked out. The grounding external terminal 5-forming conductive paste is prepared by adding a binder, a solvent, a dispersant, and so forth to powder of the metal material of construction of the grounding external terminal 5 as above described, and subsequently kneading the mixture thus obtained.

It is preferable that each of the grounding external terminal 5 and the signal external terminal 6 has a metallic layer formed on its surface in the interest of, for example, providing protection for the grounding external terminal 5 and the signal external terminal 6, or improving the mountability of the multilayer capacitor 10. The metallic layer is formed by plating technique, for example. For example, it is desirable to form one or two or more of a nickel (Ni) plating layer, a copper (Cu) plating layer, a gold (Au) plating layer, and a tin (Sn) plating layer on the surfaces of the grounding external terminal 5 and the signal external terminal 6. For example, a stack of a Ni plating layer and a Sn plating layer may be formed on the surfaces of the grounding external terminal 5 and the signal external terminal 6.

Instead of the conductor-paste baking technique, a thin-film forming method, such as vapor deposition, plating, or sputtering, may be adopted as the method of forming the grounding external terminal 5 and the signal external terminal 6.

It should be understood that the application of the invention is not limited to the multilayer capacitor 10 of Embodiment 1 thus far described, and that various changes, modifications, and improvements are possible without departing from the scope of the invention. Hereinafter, other embodiments of the invention will be described. Such parts as are common to the multilayer capacitor 10 of Embodiment 1 and multilayer capacitors of the following embodiments will be identified with like reference symbols, and the descriptions thereof may be omitted.

Embodiment 2

Hereinafter, a multilayer capacitor 10B in accordance with Embodiment 2 of the invention will be described with reference to drawings. There are provided a first grounding internal electrode 20 comprising a first grounding electrode 2A and a second grounding electrode 2B, and a second grounding internal electrode 30 comprising a third grounding electrode 3A and a fourth grounding electrode 3B.

Figure 6:
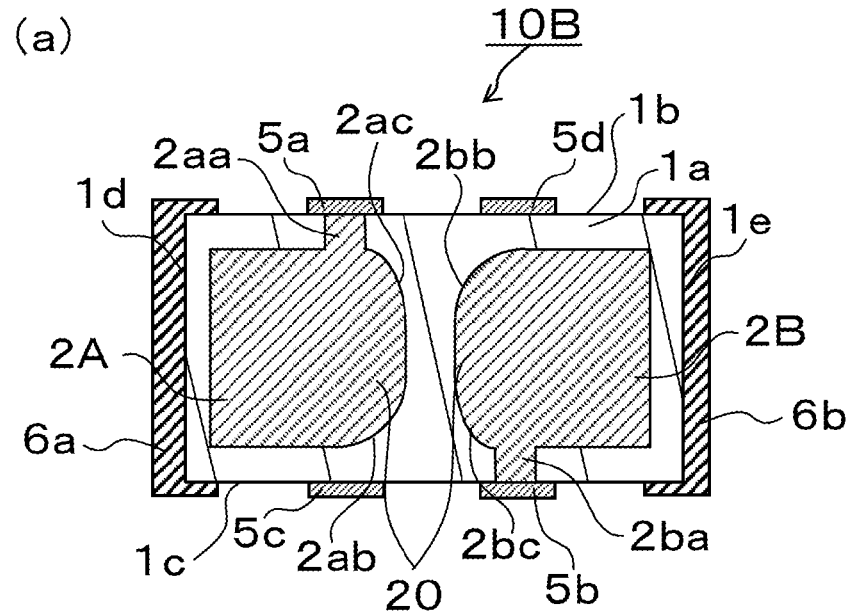
FIG. 6 is a sectional view of a stacked body as seen in a direction perpendicular to a stacking direction of the multilayer capacitor of Embodiment 2, and more specifically
Figure 6:
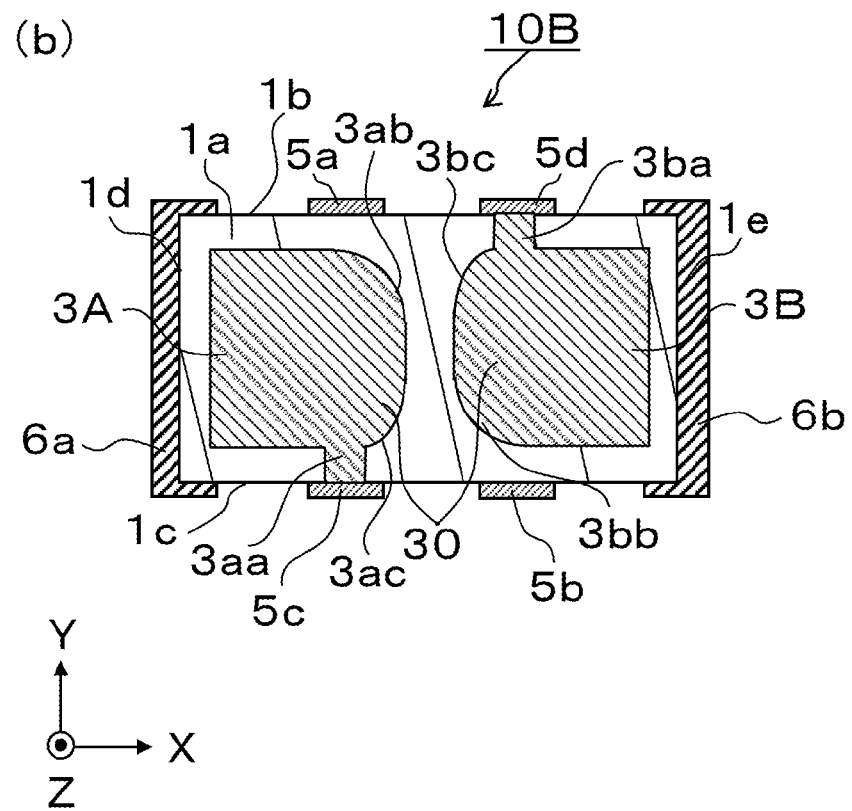

In the multilayer capacitor 10B, as shown in FIG. 6, each of the first grounding internal electrode 20 and the second grounding internal electrode 30 has a rectangular main electrode portion. The first grounding electrode 2A and the second grounding electrode 2B have, at their adjacent opposed sides, a corner 2ac and a corner 2bc, respectively, and, the third grounding electrode 3A and the fourth grounding electrode 3B have, at their adjacent opposed sides, a corner 3ac and a corner 3bc, respectively. The corners 2ac, 2bc, 3ac, and 3bc are located on the same side as the lead-out parts 2aa, 2ba, 3aa, and 3ba, respectively, which are each led to the corresponding one of the side surfaces 1b and 1c. The corners 2ac, 2bc, 3ac, and 3bc located on the same side as the corresponding lead-out parts led to the pair of side surfaces 1b and 1c are each shaped as a curved corner as seen in a plan view in the stacking direction. That is, in the first grounding internal electrode 20 and the second grounding internal electrode 30, in addition to the corners 2ab, 2bb, 3ab, and 3bb, the corners 2ac, 2bc, 3ac, and 3bc are also shaped as curved corners.

More specifically, the first grounding electrode 2A and the second grounding electrode 2B are disposed so as to confront one another at an interval, and, the corner 2ac is located close to the lead-out part 2aa, and the corner 2bc is located close to the lead-out parts 2ba. The corner 2ac and the corner 2*bc* are each shaped as a curved corner as seen in a plan view in the stacking direction. As used herein, the curved corner is construed as encompassing a rounded corner.

Similarly, the third grounding electrode 3A and the fourth grounding electrode 3B are disposed so as to confront one another at an interval, and, the corner 3*ac* is located close to the lead-out part 3*aa*, and the corner 3*bc* is located close to the lead-out parts 3*ba*. The corner 3*ac* and the corner 3*bc* are each shaped as a curved corner as seen in a plan view in the stacking direction. As used herein, the curved corner is construed as encompassing a rounded corner.

Thus, in the first grounding internal electrode 20 and the second grounding internal electrode 30 as seen in a plan view in the stacking direction, the corners 2*ab*, 2*bb*, 3*ab*, and 3*bb* are each rounded off, and the corners 2*ac*, 2*bc*, 3*ac*, and 3*bc* are also rounded off.

In the multilayer capacitor 10B, the first grounding internal electrodes 20, as well as the second grounding internal electrodes 30, have, at their adjacent opposed sides as seen in a plan view in the stacking direction, four corners which are each shaped as a curved corner, wherefore the opposed sides are each defined by a curved profile line. Thus, the first grounding internal electrodes 20, as well as the second grounding internal electrodes 30, are disposed so that the curved profile lines are opposed to each other as seen in a plan view in the stacking direction.

Moreover, in the first grounding internal electrode 20 and the second grounding internal electrode 30, the corners 2*ab*, 2*bb*, 3*ab*, and 3*bb* may be curved on a radius of curvature of 50 (μm) to 300 (μm), for example, and also the corners 2*ac*, 2*bc*, 3*ac*, and 3*bc* may be curved on a radius of curvature of 50 (μm) to 300 (μm), for example. The corner 2*ab*, 2*bb*, 3*ab*, 3*bb* and the corner 2*ac*, 2*bc*, 3*ac*, 3*bc* may have either the same radius of curvature or different radii of curvature.

Thus, in the first grounding internal electrode 20 and the second grounding internal electrode 30, the corners 2*ab*, 2*bb*, 3*ab*, and 3*bb*, and also the corners 2*ac*, 2*bc*, 3*ac*, and 3*bc* are each shaped as a curved corner. That is, since a curve is imparted to a corner part which is prone to development of reflected waves against incident waves of noise components, it is possible to suppress an increase in current density. Consequently, the multilayer capacitor 10B reduces the likelihood of distortion in the waveform of noise component current, as well as the likelihood of attenuation of incident waves of noise components, and hence passes noise component current to the grounding end (ground) efficiently to thereby reduce noise components.

Embodiment 3

Hereinafter, a multilayer capacitor 10C in accordance with Embodiment 3 of the invention will be described with reference to drawings. There are provided a first grounding internal electrode 200 comprising a first grounding electrode 2AA and a second grounding electrode 2BA, and a second grounding internal electrode 300 comprising a third grounding electrode 3AA and a fourth grounding electrode 3BA.

Figure 7:
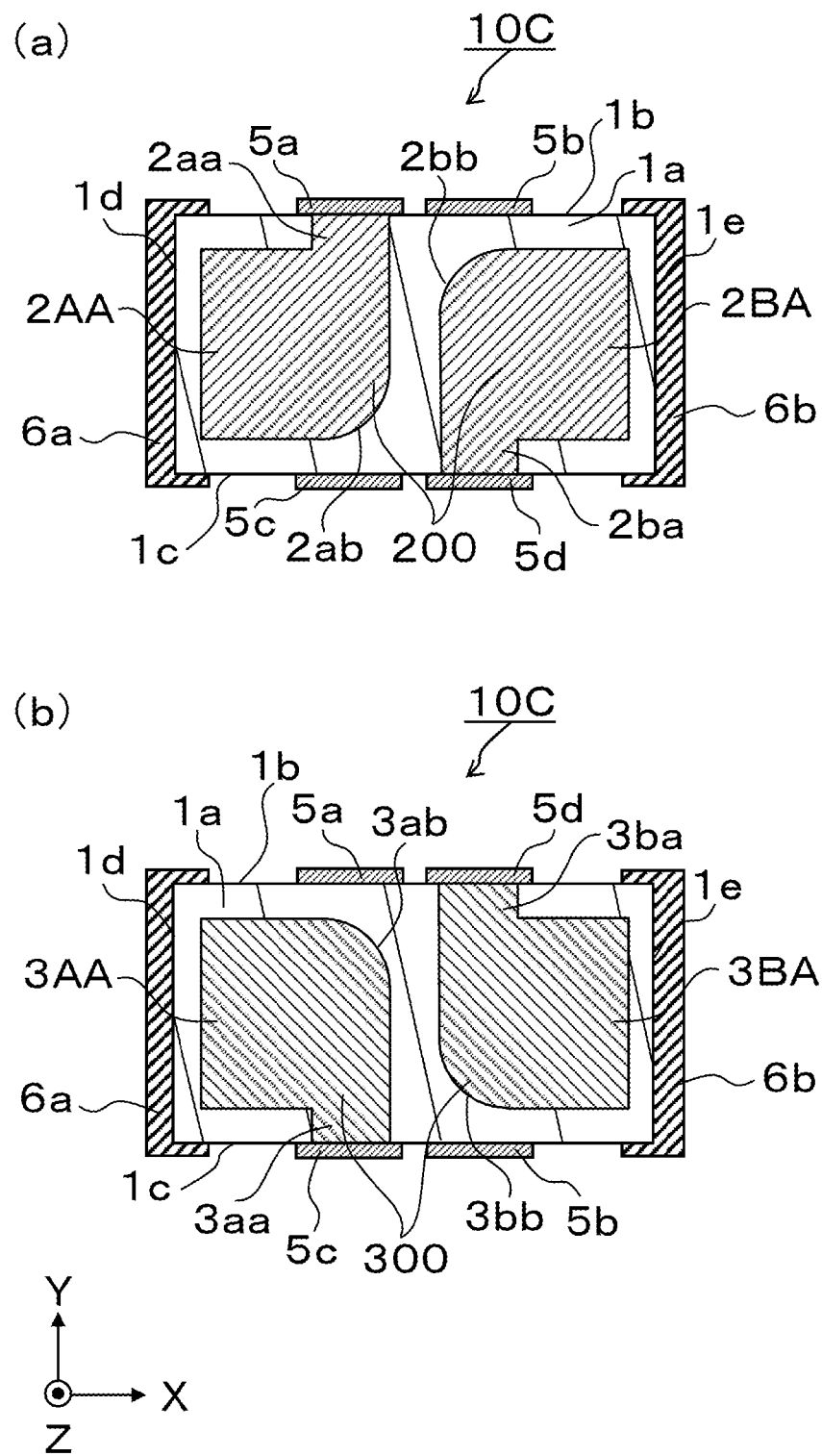
FIG. 7 is a sectional view of a stacked body as seen in a direction perpendicular to a stacking direction of the multilayer capacitor of Embodiment 3, and more specifically

In the multilayer capacitor 10C, as shown in FIG. 7, each of the first grounding internal electrode 200 and the second grounding internal electrode 300 has a rectangular main electrode portion. At the adjacent opposed sides of the first grounding electrode 2AA and the second grounding electrode 2BA are located the edges of the lead-out parts 2*aa* and 2*ba* led to the corresponding pair of side surfaces, respectively, and, at the adjacent opposed sides of the third grounding electrode 3AA and the fourth grounding electrode 3BA are located the edges of the lead-out parts 3*aa* and 3*ba* led to the corresponding pair of side surfaces, respectively. Each edge coincides with the corresponding one of the lines of continuation of the sides of the first to fourth grounding electrodes 2AA to 3BA, as seen in a plan view in the stacking direction. In the first grounding internal electrode 200 and the second grounding internal electrode 300, the corners 2*ab*, 2*bb*, 3*ab*, and 3*bb* are each shaped as a curved corner.

More specifically, the first grounding electrode 2AA and the second grounding electrode 2BA are disposed so as to confront one another at an interval, and, their adjacent opposed sides as seen in a plan view in the stacking direction, except for the corners 2*ab* and 2*bb*, are each defined by a straight line extending to the corresponding one of the side surfaces 1*b* and 1*c*. That is, the outer edges of the adjacent opposed sides of the first grounding electrode 2AA and the second grounding electrode 2BA are defined by a straight line extending from the corner 2*ab* to the side surface 1*b* and a straight line extending from the corner 2*bb* to the side surface 1*c*, respectively.

Similarly, the third grounding electrode 3AA and the fourth grounding electrode 3BA are disposed so as to confront one another at an interval, and, their adjacent opposed sides as seen in a plan view in the stacking direction, except for the corners 3*ab* and 3*bb*, are each defined by a straight line extending to the corresponding one of the side surfaces 1*c* and 1*b*. That is, the outer edges of the adjacent opposed sides of the third grounding electrode 3AA and the second grounding electrode 3BA are defined by a straight line extending from the corner 3*ab* to the side surface 1*c* and a straight line extending from the corner 3*bb* to the side surface 1*b*, respectively.

Moreover, the first to fourth grounding external terminals 5*a* to 5*d* are each disposed on the corresponding one of the side surfaces 1*b* and 1*c* so as to cover the corresponding one of the lead-out parts 2*aa*, 2*ba*, 3*aa*, and 3*ba*.

Thus, since the edge of the lead-out part led to the corresponding one of the pair of side surfaces 1*b* and 1*c* coincides with the corresponding one of the lines of continuation of the sides of the individual grounding electrodes, it follows that, in the first grounding internal electrode 200 and the second grounding internal electrode 300, there is no region of obstruction to the flow of noise component current in parts next to the lead-out parts 2*aa*, 2*ba*, 3*aa*, and 3*ba*, respectively. This helps facilitate the flow of noise component current, thus restraining the noise component current against leakage from the first grounding internal electrode 200 and the second grounding internal electrode 300 to outside. Consequently, the multilayer capacitor 10C reduces the likelihood of distortion in the waveform of noise component current, as well as the likelihood of attenuation of incident waves of noise components, and hence passes noise component current to the grounding end (ground) more efficiently to thereby achieve further reduction of noise components.

Embodiment 4

Hereinafter, multilayer capacitors 10D and 10E in accordance with Embodiment 4 of the invention will be described with reference to drawings.

Figure 9:
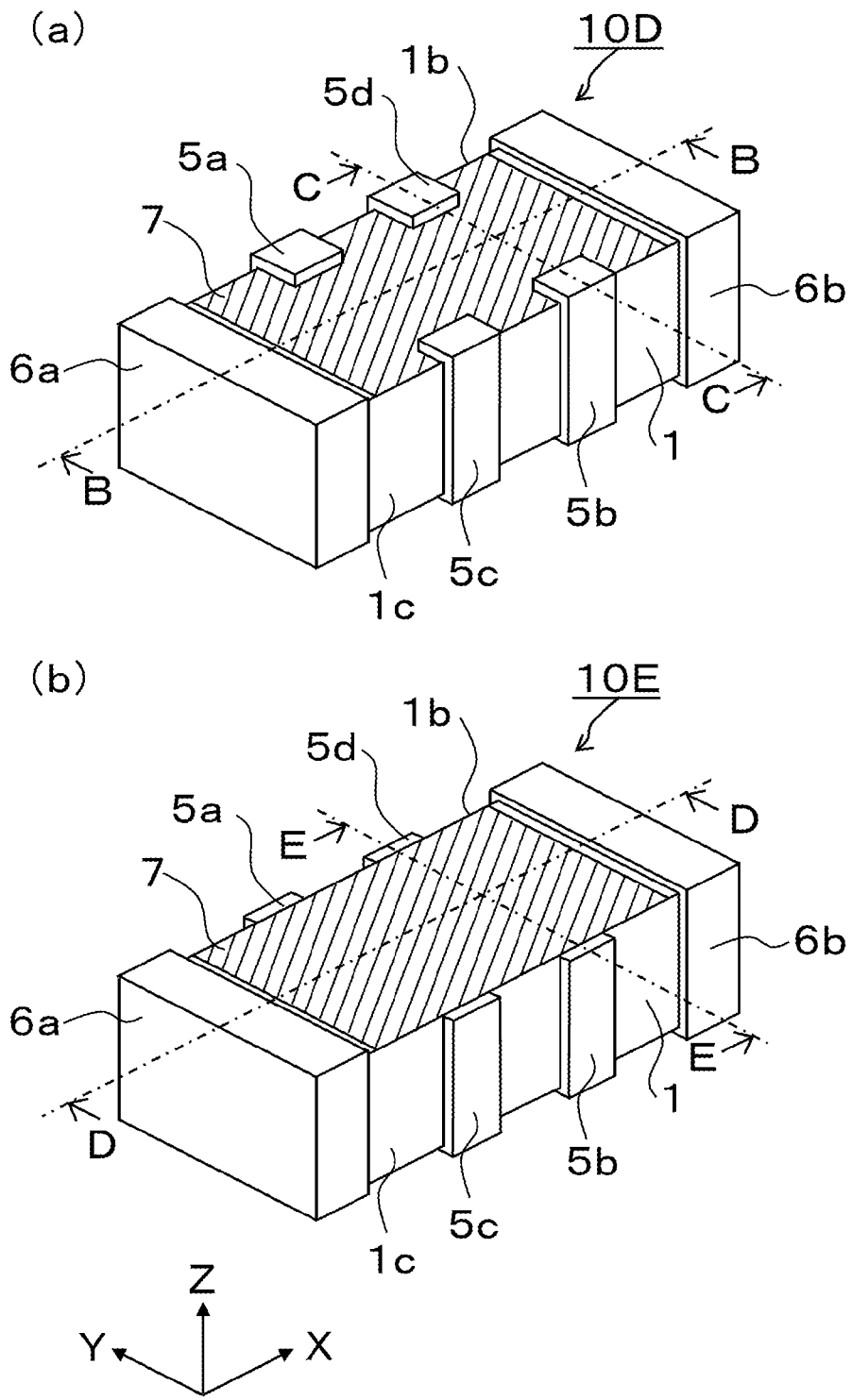
FIGS. 9(a) and 9(b) are schematic perspective views each showing the multilayer capacitor of Embodiment 4.
Figure 10:
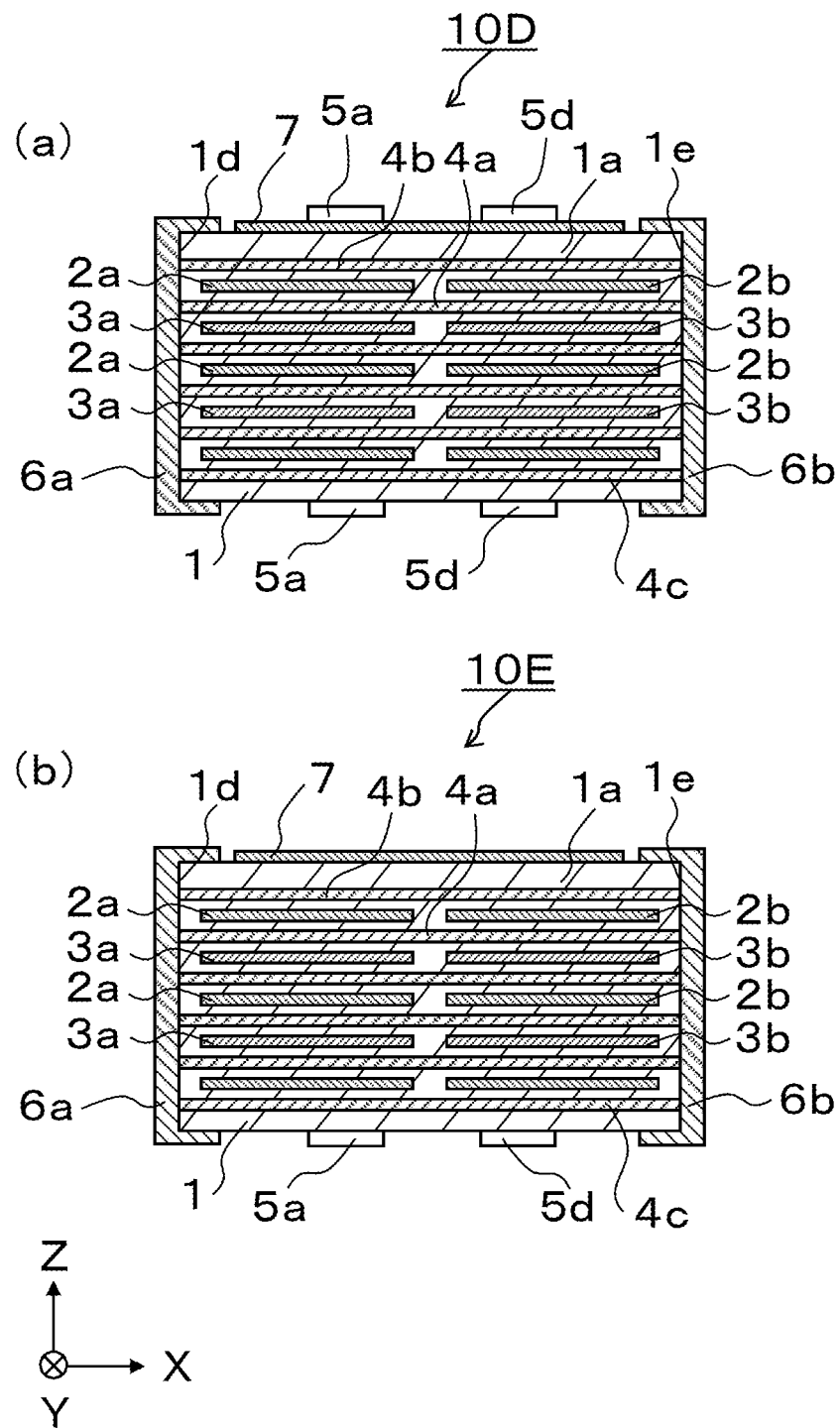
FIG. 10(a) is a sectional view of the multilayer capacitor taken along the line B-B shown in FIG. 9(a)
FIG. 10(b) is a sectional view of the multilayer capacitor taken along the line D-D shown in FIG. 9(b)

FIG. 9(*a*) is a schematic perspective view showing the multilayer capacitor 10D of Embodiment 4 of the invention. Likewise, FIG. 9(*b*) is a schematic perspective view showing the multilayer capacitor 10E of Embodiment 4 of the invention. FIG. 10(*a*) is a sectional view of the multilayer capacitor 10D taken along the line B-B shown in FIG. 9(a), and FIG. 10(b) is a sectional view of the multilayer capacitor 10E taken along the line D-D shown in FIG. 9(b).

Moreover, in the multilayer capacitor 10D, as shown in FIG. 9, one end of each of the first to fourth grounding external terminals 5a to 5d extends over the upper surface of a ground electrode 7, whereas, in the multilayer capacitor 10E, one end of each of the first to fourth grounding external terminals 5a to 5d does not extend over the upper surface of the ground electrode 7. The multilayer capacitor 10D and the multilayer capacitor 10E differ from each other only in the arrangement of the first to fourth grounding external terminals 5a to 5d.

Figure 11:
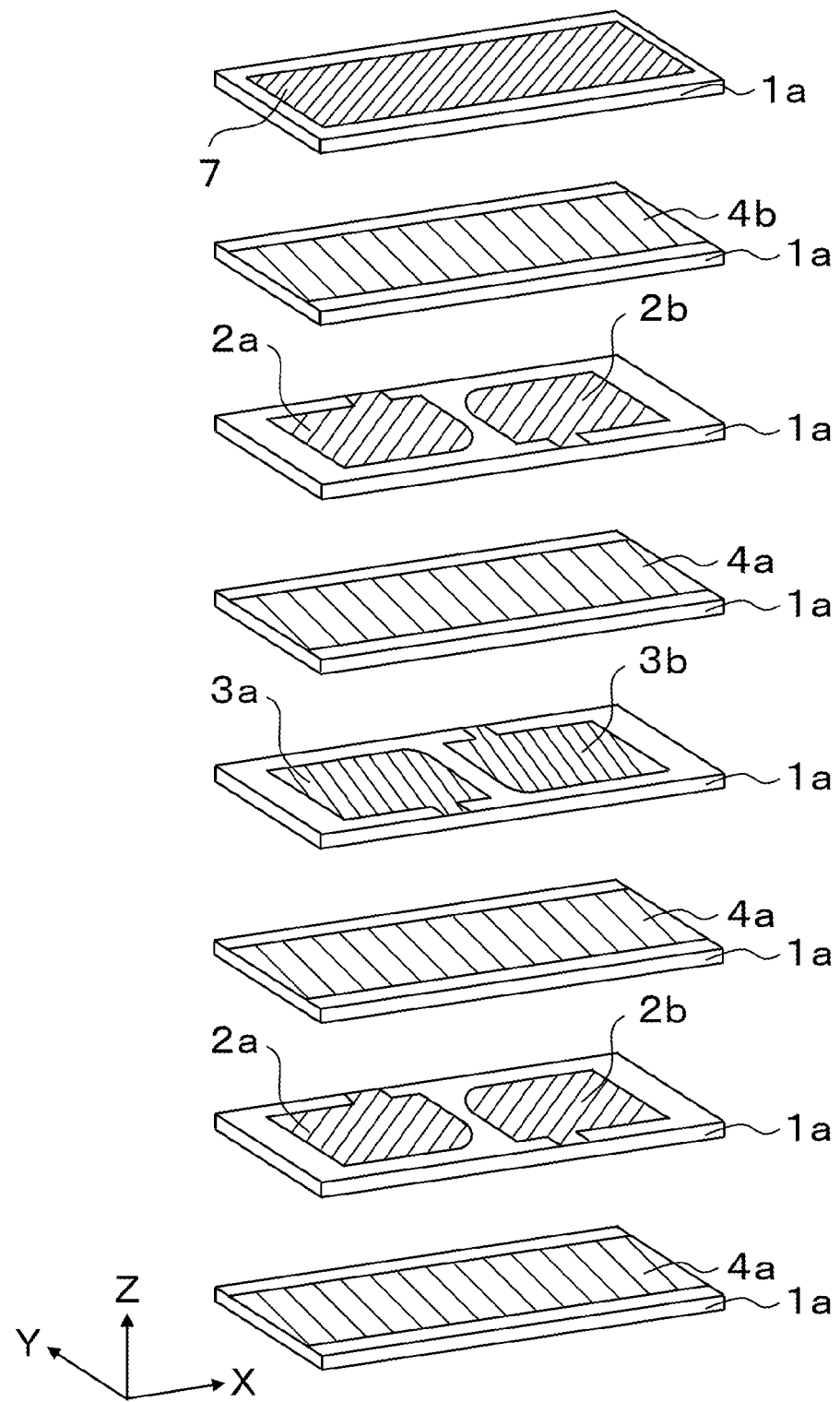
FIG. 11 is a schematic exploded perspective view of the multilayer capacitor shown in FIG. 9.
Figure 12:
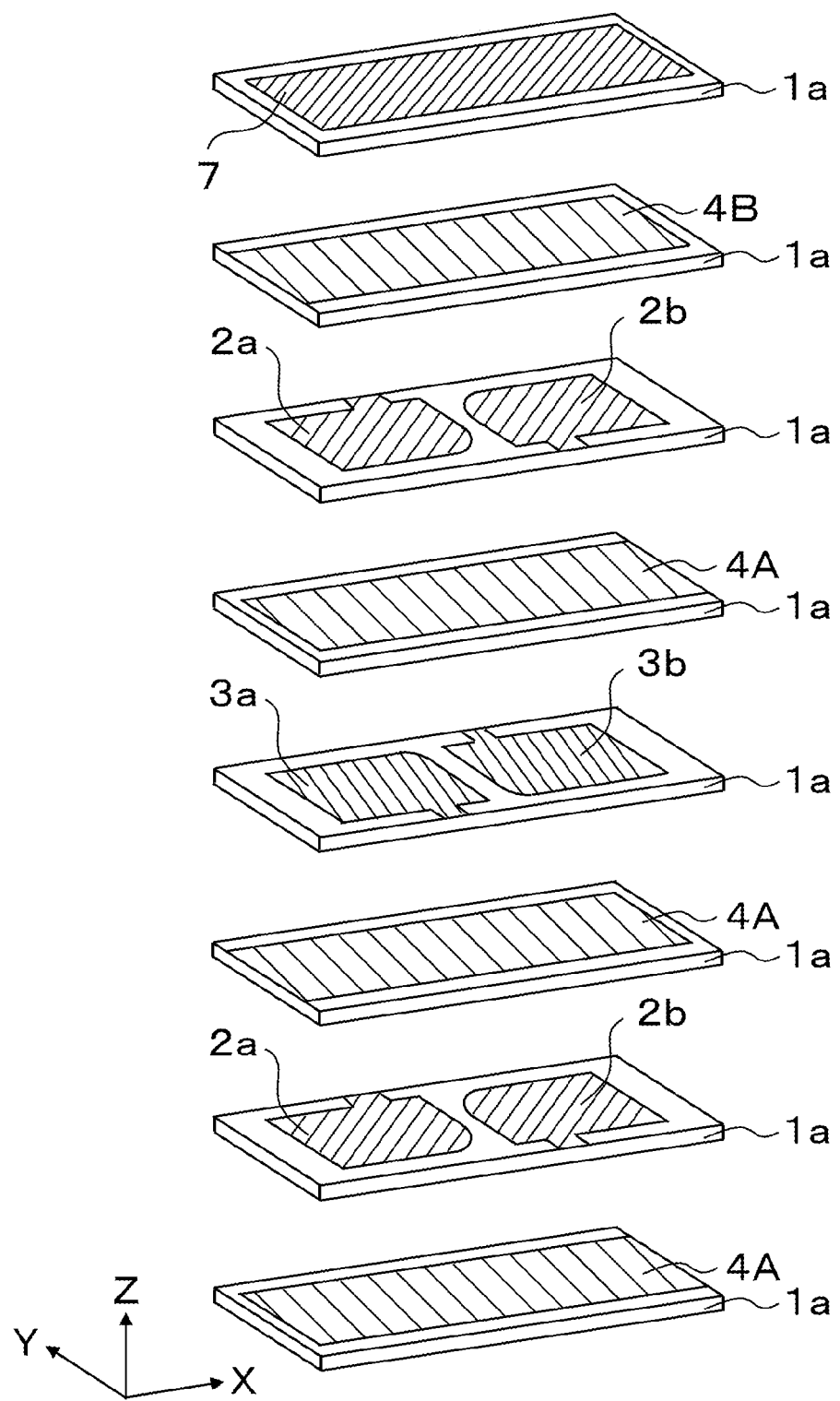
FIG. 12 is a schematic exploded perspective view of another example of the multilayer capacitor of Embodiment 4.

The first signal internal electrode 4a is formed inside the stacked body 1. As shown in FIG. 10 or 11, the first signal internal electrode 4a, which is rectangular-shaped as seen in a plan view, is disposed between the first grounding internal electrode 2 and the second grounding internal electrode 3 so as to confront the first and second grounding internal electrodes 2 and 3 in the stacking direction. While the first signal internal electrode 4a needs only be led to at least one of the pair of end faces 1d and 1e of the stacked body 1, herein, both ends of the first signal internal electrode 4a in the X-axis direction are led to the end faces 1d and 1e, respectively, so as to be exposed at the corresponding end faces. Moreover, as shown in FIG. 12, the first signal internal electrodes 4A may be disposed inside the stacked body 1 so as to extend in the X-axis direction, with their alternate ends in the X-axis direction exposed at the corresponding end faces 1d and 1e, as well as to terminate so as to be spaced from the side surfaces 1b and 1c.

There is provided a second signal internal electrode 4b in rectangular form which is located close to one of the principal surfaces (upper surface) of the stacked body 1 in the stacking direction so as to be led to at least one of the pair of confronting end faces 1d and 1e of the stacked body 1. That is, the rectangular second signal internal electrode 4b is disposed between the first grounding internal electrode 2 or the second grounding internal electrode 3 and one of the principal surfaces (upper surface) of the stacked body 1 in the stacking direction so as to confront the first grounding internal electrode 2 or the second grounding internal electrode 3 in the stacking direction.

Moreover, there is provided a third signal internal electrode 4c in rectangular form that is located close to the other one of the principal surfaces (lower surface) of the stacked body 1 in the stacking direction so as to be led to at least one of the pair of confronting end faces 1d and 1e of the stacked body 1. That is, the rectangular third signal internal electrode 4c is disposed between the first grounding internal electrode 2 or the second grounding internal electrode 3 and the other one of the principal surfaces (lower surface) of the stacked body 1 in the stacking direction so as to confront the first grounding internal electrode 2 or the second grounding internal electrode 3 in the stacking direction. The first to third signal internal electrodes 4a to 4c are each, as exemplified in FIG. 10, designed so that both ends in the X-axis direction are led to the end faces 1d and 1e, respectively, so as to be exposed at the corresponding end faces.

In the multilayer capacitor 10D, as shown in FIGS. 10(a) and 11, the second signal internal electrode 4b, the first grounding internal electrode 2, the first signal internal electrode 4a, and the second grounding internal electrode 3 are successively disposed in the order presented from the positive side to the negative side in the Z-axis direction within the stacked body 1. Each dielectric layer 1a lies between the corresponding internal electrodes. That is, the second signal internal electrode 4b, the first grounding internal electrode 2, the first signal internal electrode 4a, and the second grounding internal electrode 3 are disposed so as to confront one another, while being separated from one another by the dielectric layer 1a, within the stacked body 1, and, at least one dielectric layer 1a is interposed between the corresponding internal electrodes. A stack of the plurality of dielectric layers 1a formed with the internal electrodes constitutes the stacked body 1 serving as the main body of the multilayer capacitor 10D.

Moreover, in the multilayer capacitor 10D, in FIG. 10(a), the outermost internal electrode layers (internal electrodes located close to the top and the bottom, respectively, of the construction) in the Z-axis direction are constituted by the second signal internal electrode 4b and the third signal internal electrode 4c, respectively. Note that the multilayer capacitor 10D is not limited to the laminated structure as shown in FIG. 10(a). For example, the multilayer capacitor 10D may be designed so that the second signal internal electrode 4b, the second grounding internal electrode 3, the first signal internal electrode 4a, and the first grounding internal electrode 2 are successively disposed in the order presented from the positive side to the negative side in the Z-axis direction. Moreover, the number of the signal internal electrodes 4, the number of the first grounding internal electrodes 2, and the number of the second grounding internal electrodes 3 are suitably determined with consideration given to the characteristics of the multilayer capacitor 10D and so forth.

In the multilayer capacitor 10D, as shown in FIGS. 9(a) and 10(a), the ground electrode 7 is disposed so as to confront the second signal internal electrode 4b in the stacking direction, on the upper surface (one principal surface) of the stacked body 1 in the stacking direction so as to be spaced away from the first signal external terminal 6a and the second signal external terminal 6b. That is, the ground electrode 7 is opposed to the second signal internal electrode 4b, and is positioned between the first signal external terminal 6a and the second signal external terminal 6b. Moreover, one end of each of the first to fourth grounding external terminals 5a to 5d extends over the upper surface of the ground electrode 7, and, the ground electrode 7 is electrically connected to the first to fourth grounding external terminals 5a to 5d.

Thus, the first to fourth grounding external terminals 5a to 5d are disposed so as to overlap the ground electrode 7 as seen in a plan view in the stacking direction, and, the ground electrode 7 and the first to fourth grounding external terminals 5a to 5d are at the same potential. The ground electrode 7 has a thickness of 10 (μm) to 20 (μm), for example.

In the multilayer capacitor 10D, as shown in FIG. 10(a), the second signal internal electrode 4b is placed between the first grounding internal electrode 2 and one principal surface (upper surface) of the stacked body 1, and, one of the outermost internal electrode layers within the stacked body 1, which is located close to the upper surface (one principal surface) of the stacked body 1 in the Z-axis direction, is constituted by the second signal internal electrode 4b. Thus, in the multilayer capacitor 10D, the second signal internal electrode 4b is located close to the upper surface (one principal surface) of the stacked body 1 within the stacked body 1, and, the ground electrode 7 is opposed to the upper surface (one principal surface)-side second signal internal electrode 4b within the stacked body 1.

For example, in a multilayer capacitor comprising a stacked body internally formed with a ground electrode (grounding electrode), more specifically, in a multilayer capacitor comprising a stacked body in which a ground electrode (grounding electrode) and a signal internal electrode are successively disposed in the order presented from the upper surface (one principal surface) to the lower surface (the other principal surface) of the stacked body, if a thick ground electrode (grounding electrode) is disposed inside the stacked body 1, delamination may occur between the ground electrode (grounding electrode) and a dielectric layer. This leads to difficulties in increasing the thickness of the ground electrode (grounding electrode), and hence to difficulties in enhancing the shielding capability.

On the other hand, in the multilayer capacitor 10D, since the ground electrode 7 is disposed on the upper surface (one principal surface) of the stacked body 1, it is possible to adjust the thickness of the ground electrode 7 properly depending on application purposes, and thereby enhance the shielding capability. Moreover, in the multilayer capacitor 10D, since an adequately large space can be left between the ground electrode 7 and the second signal internal electrode 4b, it is possible to enhance the shielding capability, and thereby reduce the influence of noise on the second signal internal electrode 4b.

Moreover, for example, when the multilayer capacitor 10D is incorporated in mobile terminal equipment, such as a smartphone, with the signal internal electrode 4 electrically connected to LSI, in order to suppress LSI malfunction, the shielding capability needs to be enhanced to inhibit noise from intrusion into the LSI. In such a case, in the multilayer capacitor 10D, the thickness of the ground electrode 7 disposed on the upper surface (one principal surface) of the stacked body 1 is increased to enhance the shielding capability, thus reducing the influence of noise on the second signal internal electrode 4b. This makes it possible to inhibit intrusion of noise to the LSI from the multilayer capacitor 10D, and thereby suppress LSI malfunction.

The ground electrode 7 is made of an electrically conductive material, for example, a metal material such as nickel (Ni), copper (Cu), silver (Ag), palladium (Pd), or gold (Au), or an alloy material containing one or more of the described metal materials, such as a Ag—Pd alloy.

In the multilayer capacitor 10D, as shown in FIG. 9(a), each of the first to fourth grounding external terminals 5a to 5d is disposed on the corresponding one of the pair of confronting side surfaces 1b and 1c of the stacked body 1, with its one end extended over the surface of the ground electrode 7, and the other end extended over the lower surface (the other principal surface) of the stacked body 1.

Moreover, in the multilayer capacitor 10D, one end of each of the first to fourth grounding external terminals 5a to 5d extends over the surface of the ground electrode 7, and is hence able to abut on a case (housing) or the like for accommodating a circuit board. That is, when one end of each of the first to fourth grounding external terminals 5a to 5d abuts on the case or the like, in the multilayer capacitor 10D, the end of each of the first to fourth grounding external terminals 5a to 5d and the case or the like are at the same potential. The case or the like for accommodating a circuit board is connected to ground. Moreover, the multilayer capacitor 10D is mounted, with its ground electrode 7-free lower surface (the other principal surface) opposed to a circuit board.

In the multilayer capacitor 10D whose first to fourth grounding external terminals 5a to 5d will abut on the case or the like, the use of an elastic material for the ground electrode 7 helps facilitate deformation of the ground electrode 7, thus permitting the first to fourth grounding external terminals 5a to 5d to abut on the case or the like more securely.

With the use of an elastic material for the ground electrode 7, even when a stress is applied to the multilayer capacitor 10D through the case or the like abutting on it, the stress can be relaxed by the ground electrode 7, thus rendering the multilayer capacitor resistant to a trouble such as cracking. For example, even when the case or the like abutting on the multilayer capacitor 10D undergoes warpage, the warpage can be reduced by the ground electrode 7, thus rendering the multilayer capacitor resistant to a trouble such as cracking.

For example, in the case of mounting the multilayer capacitor 10D on a circuit board by an automated mounting machine equipped with a suction nozzle, with the use of an elastic material for the ground electrode 7 disposed on the upper surface of the stacked body 1, in the multilayer capacitor 10D, the ground electrode 7 becomes deformed readily, wherefore a gap is less likely to occur between the ground electrode 7 and the suction nozzle. This helps suppress air leakage at the suction nozzle, and thus improves the suction capability of the suction nozzle. Consequently, the suction nozzle-equipped automated mounting machine moves and mounts the multilayer capacitor 10D onto the circuit board without fail. Moreover, even if a stress is developed during the sucking action of the suction nozzle, the stress can be relaxed by the ground electrode 7, thus rendering the multilayer capacitor 10D resistant to stress-induced damage. By virtue of the ground electrode 7 made of an elastic conductive resin material disposed on the upper surface of the stacked body 1, the multilayer capacitor 10D can be mounted on the circuit board with higher mountability, and can also be resistant to damage.

It is thus desirable to use an elastic material, in particular, a conductive resin material, for the ground electrode 7. The conductive resin material is composed of a resin material, such as epoxy resin, silicone resin, or urethane resin, which contains, as a conductive material, for example, powder (filler) of a metal material such as nickel (Ni), copper (Cu), silver (Ag), platinum (Pt), palladium (Pd), or gold (Au), or powder (filler) of an alloy material containing one or more of the described metal materials, such as a Ag—Pd alloy. For example, in an epoxy resin-made conductive resin material used for the ground electrode 7, silver powder (filler) is included in an amount of 70 (% by mass) to 85 (% by mass) as the conductive material, and, its elastic modulus falls in the range of 1 (PGa) to 10 (PGa).

In the multilayer capacitor 10D of Embodiment 4, of the internal electrodes disposed inside the stacked body 1, the second signal internal electrode 4b is placed as the outermost internal electrode layer located close to the upper surface (one principal surface) of the stacked body 1, and, this outermost second signal internal electrode 4b and the ground electrode 7 are disposed so as to confront one another. For example, if the ground electrode 7 is not opposed to the outermost second signal internal electrode 4b, it will be difficult to block, for example, an external electric field, causing intrusion of noise into the second signal internal electrode 4b.

In this regard, in the multilayer capacitor 10D, the ground electrode 7 is disposed on the upper surface of the stacked body 1 so as to face the outermost second signal internal electrode 4b, wherefore an external electric field, for example, can be blocked by the ground electrode 7, thus enhancing the shielding capability. That is, in the multilayer capacitor 10D, since the shielding capability is enhanced by the ground electrode 7, it is possible to reduce the influence of noise on the outermost second signal internal electrode 4b. Consequently, the multilayer capacitor 10D is resistant to malfunction of an electronic component, such as LSI, electrically connected to the signal internal electrode 4.

Thus, in the multilayer capacitor 10D, the arrangement of the ground electrode 7 so as to confront the second signal internal electrode 4b makes it possible to attain shielding capability and thereby reduce the influence of noise such for example as noise that is over the limit of input noise immunity or disturbance noise resulting from electrostatic discharge.

Moreover, in the multilayer capacitor 10D, the first grounding internal electrodes 2, as well as the second grounding internal electrodes 3, have, at their adjacent opposed sides, the corners 2ab and 2bb, as well as the corners 3ab and 3bb, which are each shaped as a curved corner. This helps reduce noise in high-frequency ranges, for example, noise in a signal line or a power supply line in high-frequency ranges. Moreover, the placement of the ground electrode 7 allows for enhancement in shielding capability. Note that the technologies in Embodiment 2 and Embodiment 3 are applicable to the multilayer capacitor D.

Moreover, in the multilayer capacitor 10D, one end of each of the first to fourth grounding external terminals 5a to 5d extends over the surface of the ground electrode 7. Therefore, for example, when each end abuts on a case or the like for accommodating a circuit board, further grounding reinforcement is achieved.

The arrangement of the first to fourth grounding external terminals 5a to 5d is not limited to that in the multilayer capacitor 10D. For example, in the multilayer capacitor 10E, as shown in FIGS. 9(b) and 10(b), one end of each of the first to fourth grounding external terminals 5a to 5d does not necessarily have to extend over the surface of the ground electrode 7. In this case, the ground electrode 7 is disposed on the upper surface (one principal surface) of the stacked body 1 in the stacking direction so as to be spaced away from the first signal external terminal 6a and the second signal external terminal 6b, and, one end of each of the first to fourth grounding external terminals 5a to 5d is connected to that part of the ground electrode 7 exposed at the side surface 1b, 1c.

Moreover, in the multilayer capacitor 10E, like the multilayer capacitor 10D, as shown in FIG. 10(b), the outermost internal electrode layer located close to the upper surface (one principal surface) of the stacked body 1 in the Z-axis direction is constituted by the second signal internal electrode 4b. That is, the second signal internal electrode 4b is located close to the one principal surface, and, the ground electrode 7 is opposed to the upper surface (one principal surface)-side second signal internal electrode 4b.

In the case where the first to fourth grounding external terminals 5a to 5d do not extend over the surface of the ground electrode 7, in the multilayer capacitor 10E, for example, the ground electrode 7 may abut directly on a case or the like for accommodating a circuit board. This helps increase the abutting areas of the ground electrode 7 and the case or the like, thus achieving further grounding reinforcement.

In the multilayer capacitor 10E, like the multilayer capacitor 10D, with the use of an elastic material for the ground electrode 7, even when a stress is applied to the multilayer capacitor 10E through the case or the like abutting thereon, the stress can be relaxed directly by the ground electrode 7, thus rendering the multilayer capacitor resistant to a trouble such as cracking. For example, even when the case or the like abutting on the multilayer capacitor 10A undergoes warpage, the warpage can be reduced directly by the ground electrode 7, thus rendering the multilayer capacitor resistant to a trouble such as cracking.

The following describes the attenuation characteristics of the multilayer capacitor 10D with reference to drawings. For purposes of comparison, in addition to the multilayer capacitor 10D of Embodiment 4 (hereafter referred to as "Example 2"), a multilayer capacitor having an internal electrode structure as shown in FIG. 17 is prepared as a conventional example.

Figure 16:
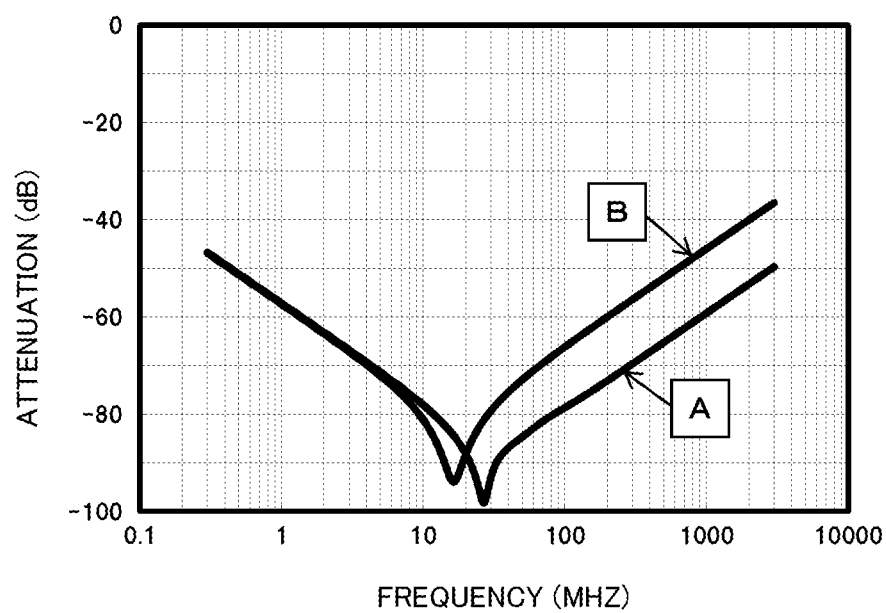
FIG. 16 is a chart showing a graph representing the attenuation characteristics of the multilayer capacitor shown in FIG. 9(a)

In FIG. 16, there are shown a characteristic curve A indicative of the attenuation characteristics of the multilayer capacitor 10D of Example 2 and a characteristic curve B indicative of the attenuation characteristics of the conventional multilayer capacitor. For example, at a frequency of 100 (MHz) laid off as an abscissa in the graph shown in FIG. 16, the characteristic curve B corresponding to the conventional multilayer capacitor represents attenuation of about −66 (dB), whereas the characteristic curve A corresponding to the multilayer capacitor 10D of Example 2 represents attenuation of about −79 (dB). As to attenuation characteristics at 100 (MHz), the amount of attenuation in the multilayer capacitor 10D of Example 2 is 13 (dB) greater than the amount of attenuation in the conventional multilayer capacitor. Note that the conventional multilayer capacitor and the multilayer capacitor of Example 2 have dimensions of 1.0 (mm) by 0.5 (mm) by 0.5 (mm) high.

Moreover, ESL in the conventional example is 60 (pH), whereas ESL in Example 2 is 45 (pH). That is, in point of ESL reduction, the multilayer capacitor 10D of Example 2 is superior to the conventional multilayer capacitor. The conventional multilayer capacitor exhibits capacitance of 4.7 (μF) and equivalent series resistance (ESR) of 2.5 (mΩ)). On the other hand, the multilayer capacitor of Example 2 exhibits capacitance of 4.7 (μF) and equivalent series resistance (ESR) of 2.1 (mΩ)).

Thus, the multilayer capacitor 10D which is of reduced ESL allows for a shift of resonance frequency to the high-frequency side, and hence achieves noise reduction in high-frequency ranges.

Moreover, in the case of the multilayer capacitor 10D devoid of the ground electrode 7, at a frequency of 100 (MHz) laid off as an abscissa in the graph, the characteristic curve (not shown) indicative of the attenuation characteristics of the multilayer capacitor represents attenuation of about −72 (dB). That is, as to attenuation characteristics at 100 (MHz), the amount of attenuation in the multilayer capacitor 10D having the ground electrode 7 is 7 (dB) greater than the amount of attenuation in the ground electrode 7-free multilayer capacitor. The ground electrode 7-free multilayer capacitor exhibits ESL of 50 (pH), capacitance of 4.7 (μF), and equivalent series resistance (ESR) of 2.3 (mΩ)).

The multilayer capacitor 10D, as is the multilayer capacitor 10, can be produced by the manufacturing method as above described.

In addition to the plurality of first to third ceramic green sheets, a fourth ceramic green sheet is prepared. The fourth ceramic green sheet is used to form the ground electrode 7.

Moreover, in the fourth ceramic green sheet, to form the ground electrode 7, the patterns of the ground electrode 7 are disposed at predetermined spacing on one and the same plane, and, when the ground electrode 7 is made of a metal material, a conductor paste layer for the ground electrode 7 is formed of a conductor paste of the metal material. To obtain numbers of the multilayer capacitors 10, the plurality of ground electrodes 7 are formed in a single fourth ceramic green sheet. The conductor paste layer for the ground electrode 7 is formed by printing the conductor paste in predetermined patterns onto the fourth ceramic green sheet by the screen printing technique, for example. The conductor paste layer for the ground electrode 7 becomes the ground electrode 7.

On the other hand, when the ground electrode 7 is made of a conductive resin material, the conductor paste layer for the ground electrode 7 is formed of a paste of the conductive resin material. The conductor paste layer for the ground electrode 7 is formed by printing the metal material paste or the conductive resin material paste in predetermined patterns onto the fourth ceramic green sheet by the screen printing technique, for example. Moreover, the conductive resin material paste is prepared by adding powder (filler) of the earlier described conductor material (metal or alloy material), a solvent, and so forth to a resin material such as epoxy resin, silicone resin, or urethane resin, and subsequently kneading the mixture thus obtained. Examples of the conductive material include a metal material such as nickel (Ni), copper (Cu), silver (Ag), platinum (Pt), palladium (Pd), or gold (Au), and an alloy material containing one or more of the described metal materials, such as a Ag—Pd alloy.

Moreover, the metal material conductor paste for the ground electrode 7 is prepared by adding an additive (dielectric material), a binder, a solvent, a dispersant, and so forth to powder of the ground electrode 7-forming conductor material (metal material), and subsequently kneading the mixture thus obtained. Examples of the conductive material include a metal material such as nickel (Ni), copper (Cu), silver (Ag), palladium (Pd), or gold (Au), and an alloy material containing one or more of the described metal materials, such as a Ag—Pd alloy. When the ground electrode 7 is made of the metal or alloy material, it is preferable that the ground electrode 7 is made of the same material as that used for the first and second grounding internal electrodes 2 and 3 and the signal internal electrode 4.

The first to fourth ceramic green sheets thus stacked are pressed together into a single-piece construction, forming a raw stacked body of large size including numbers of raw stacked bodies 1. This large-size raw stacked body is cut up to obtain the raw stacked bodies 1, each of which will constitute the stacked body 1 of the multilayer capacitor 10D shown in FIG. 9(a). For example, a dicing blade may be used to cut up the large-size raw stacked body.

Embodiment 5

Hereinafter, multilayer capacitors 10F and 10G in accordance with Embodiment 5 of the invention will be described with reference to drawings. In the multilayer capacitor 10F, one end of each of the first to fourth grounding external terminals 5a to 5d extends over the surface of a ground electrode 7, whereas, in the multilayer capacitor 10G, one end of each of the first to fourth grounding external terminals 5a to 5d does not extend over the surface of the ground electrode 7.

Figure 13:
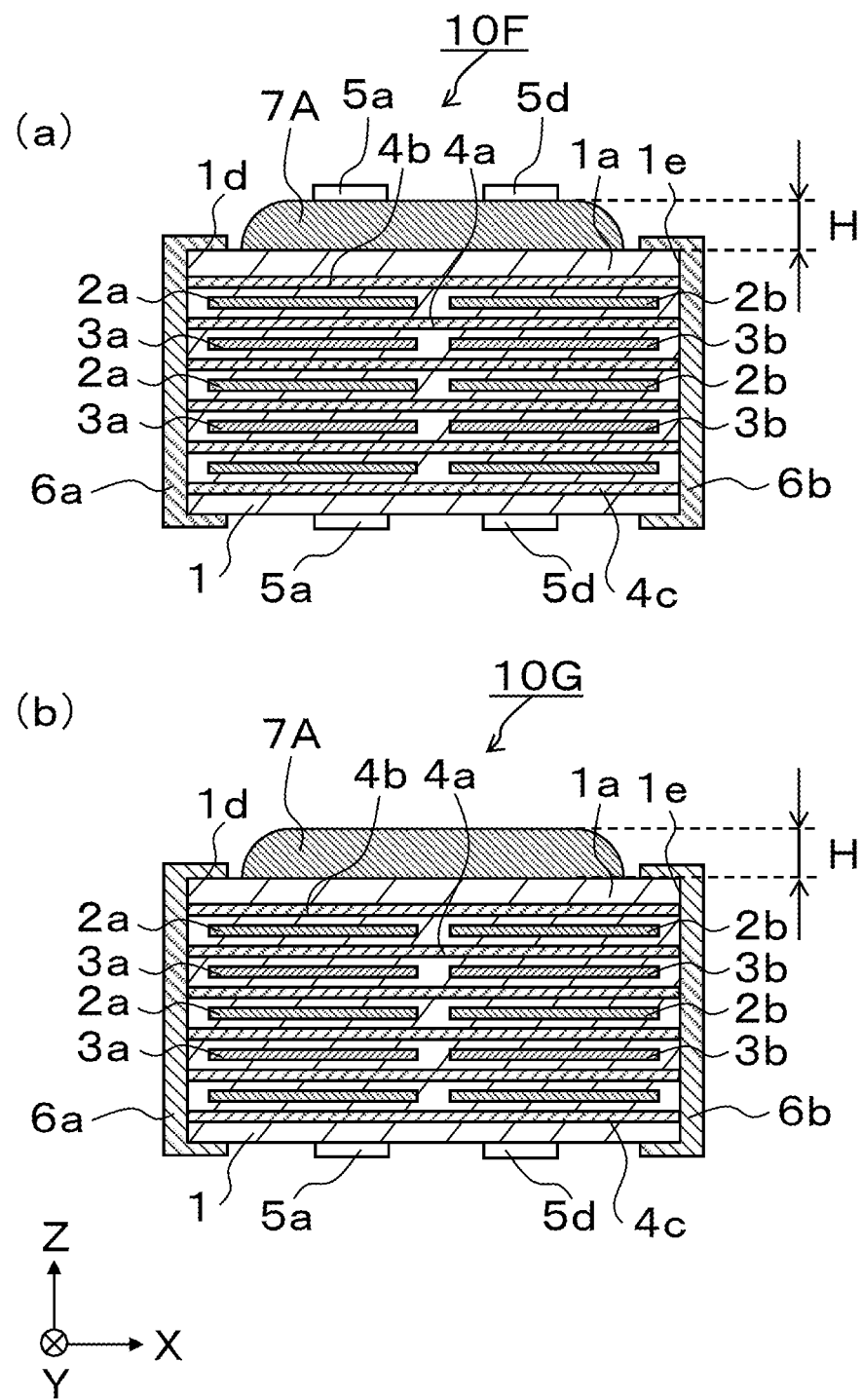
FIG. 13 is a sectional view of the multilayer capacitor of Embodiment 5, and more specifically

In the multilayer capacitor 10F, as shown in FIG. 13(a), one end of each of the pair of signal external terminals 6 extends over the upper surface (one principal surface) of the stacked body 1, and, the ground electrode 7A is disposed on the upper surface (one principal surface) of the stacked body 1. On the upper surface (one principal surface), the surface of the ground electrode 7 is located outside the end of each of the pair of signal external terminals 6 extending over the upper surface (one principal surface) in the stacking direction. One end of each of the first to fourth grounding external terminals 5a to 5d extends over the surface of the ground electrode 7A. The ground electrode 7A has a thickness H of 10 (μm) to 100 (μm), for example. The increased thickness is conducive to grounding reinforcement and hence to enhanced shielding capability in the multilayer capacitor 10F, thus inhibiting noise from intrusion into the second signal internal electrode 4b. Another advantage is an improvement in abutment between the first to fourth grounding external terminals 5a to 5d and a case or the like.

Figure 14:
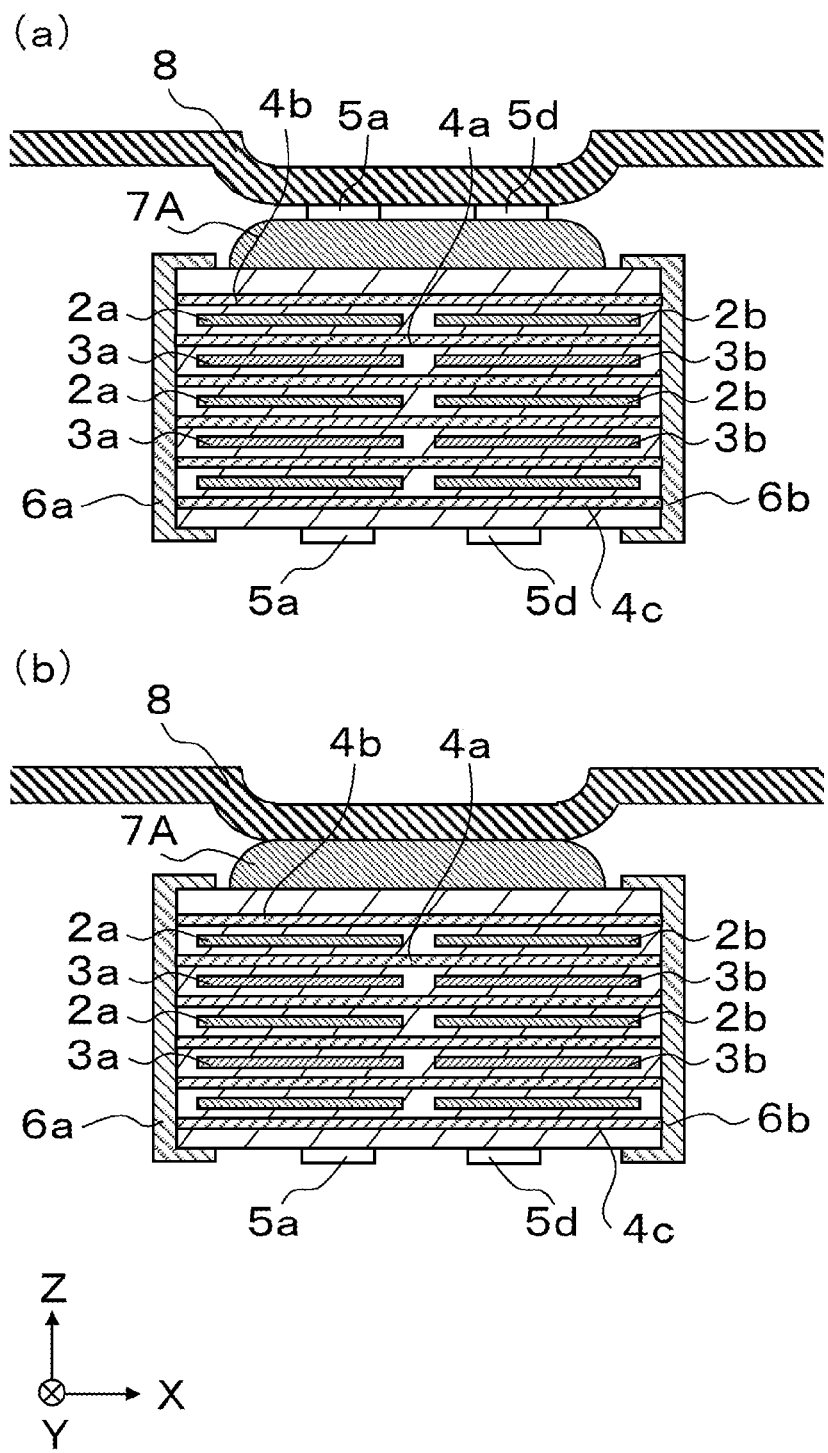
FIGS. 14(a) and 14(b) are sectional views for explaining conditions where a case is abutting on the multilayer capacitor shown in FIG. 13.

Thus, in the multilayer capacitor 10F, as shown in FIG. 13(a), the ground electrode 7A protrudes outward beyond the end of each of the pair of signal external terminals 6 in the stacking direction, and, one end of each of the first to fourth grounding external terminals 5a to 5d extends over the surface of the ground electrode 7A. Therefore, for example, in the case where the multilayer capacitor abuts on a case or the like for accommodating a circuit board, as shown in FIG. 14(a), each end abuts on the case or the like with ease, thus achieving grounding reinforcement.

Moreover, in the multilayer capacitor 10F, since the ground electrode 7A protrudes outward beyond the end of the signal external terminal 6 in the stacking direction, it is possible to restrain the case or the like against contact with the first signal external terminal 6a and the second signal external terminal 6b, and thereby suppress short-circuiting between the case or the like and the signal external terminal 6.

Moreover, in the multilayer capacitor 10G, as shown in FIG. 13(b), one end of each of the pair of signal external terminals 6 extends over the upper surface (one principal surface) of the stacked body 1, and, the ground electrode 7A is disposed on the upper surface (one principal surface) of the stacked body 1. On the upper surface (one principal surface), the surface of the ground electrode 7 is located outside the end of each of the pair of signal external terminals 6 extending over the upper surface (one principal surface) in the stacking direction. One end of each of the first to fourth grounding external terminals 5a to 5d is connected to that part of the ground electrode 7A exposed at the side surface 1b, 1c. In the multilayer capacitor 10G, since one end of each of the first to fourth grounding external terminals 5a to 5d does not extend over the surface of the ground electrode 7A, it follows that, as shown in FIG. 14(b), the ground electrode 7A may abut directly on the case or the like for accommodating a circuit board. This allows for easy abutment with the case or the like, and also increases the abutting areas of the ground electrode 7A and the case or the like, thus achieving further grounding reinforcement. In the multilayer capacitor 10G capable of grounding reinforcement and enhancement in shielding capability, noise is less likely to find its way into the second signal internal electrode 4b, and also an improvement in abutment between the ground electrode 7A and the case or the like is achieved.

Moreover, in the multilayer capacitor 10G, like the multilayer capacitor 10F, since the ground electrode 7A protrudes outward beyond the end of the signal external terminal 6 in the stacking direction, it is possible to restrain the case or the like against contact with the first signal external terminal 6a and the second signal external terminal 6b, and thereby suppress short-circuiting between the case or the like and the signal external terminal 6.

Figure 15:
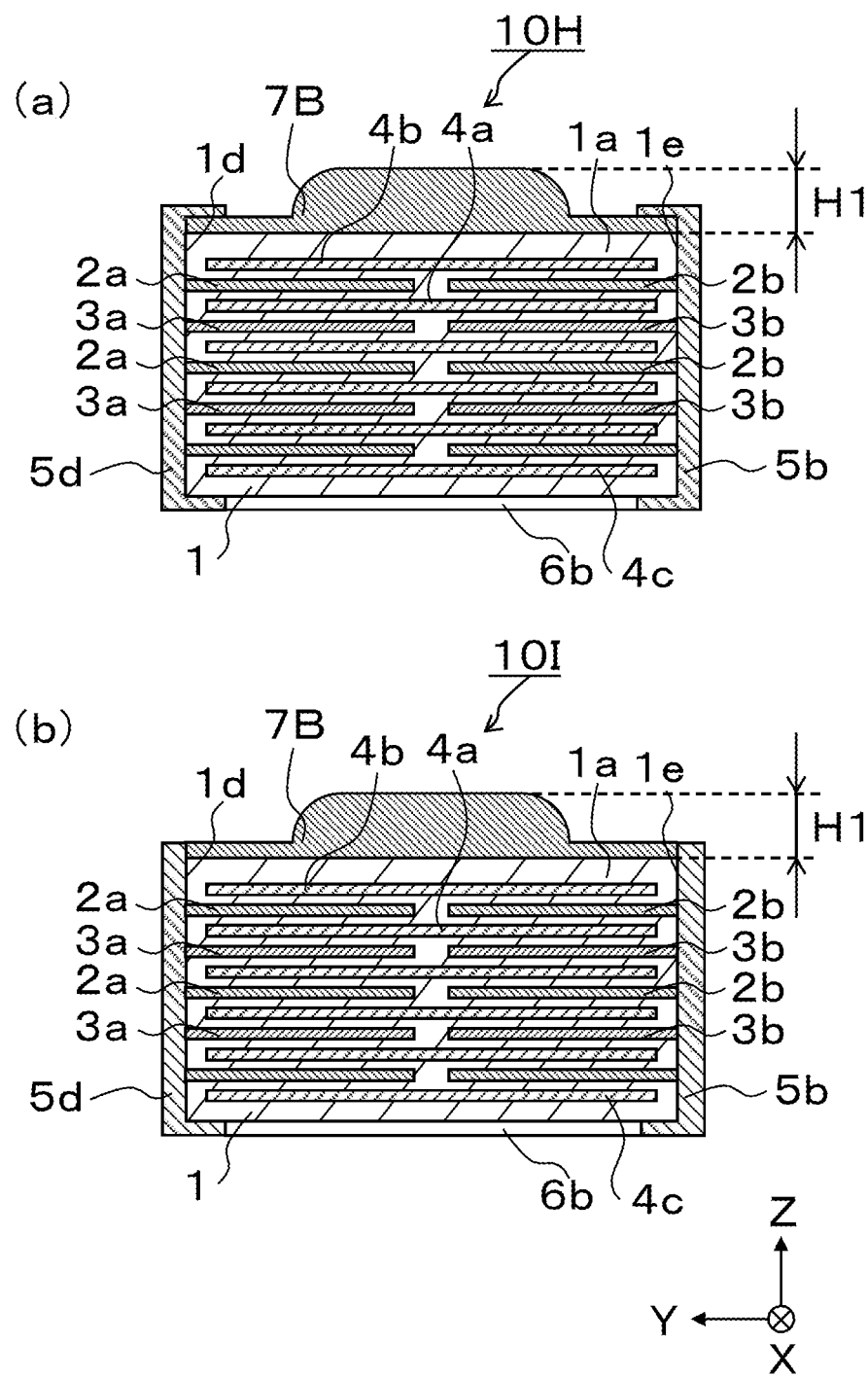
FIG. 15 is a sectional view of another example of the multilayer capacitor of Embodiment 5, and more specifically

Moreover, the ground electrode 7B needs only be protruded outward beyond the end of each of the pair of signal external terminals 6 extending over the upper surface (one principal surface) in the stacking direction, and may alternatively be configured as shown in FIG. 15 showing a multilayer capacitor 10H and a multilayer capacitor 10I. In the multilayer capacitor 10H, one end of each of the first to fourth grounding external terminals 5a to 5d extends over the surface of the ground electrode 7B, whereas, in the multilayer capacitor 10I, one end of each of the first to fourth grounding external terminals 5a to 5d does not extend over the surface of the ground electrode 7B.

As shown in FIG. 15, the ground electrode 7B is configured so that its midportion protrudes outward beyond one end of each of the first to fourth grounding external terminals 5a to 5d in the stacking direction.

In the multilayer capacitor 10H, at the midportion of the stacked body 1 in the Y-axis direction, the ground electrode 7B protrudes outward beyond one end of each of the first to fourth grounding external terminals 5a to 5d extending over the upper surface (one principal surface) in the stacking direction, and, one end of each of the first to fourth grounding external terminals 5a to 5d is disposed so as to overlap the end of the surface of the ground electrode 7B. Moreover, in the multilayer capacitor 10I, the ground electrode 7B is connected to one end of each of the first to fourth grounding external terminals 5a to 5d, and, at the midportion of the stacked body 1 in the Y-axis direction, the ground electrode 7B protrudes outward beyond one end of each of the first to fourth grounding external terminals 5a to 5d in the stacking direction.

In each of the multilayer capacitor 10H and the multilayer capacitor 10I, the protruding midportion of the external electrode 7B extends along a direction longitudinally of the stacked body 1 (X-axis direction). The ground electrode 7B has a thickness H1 of 10 (μm) to 100 (μm), for example. The increased thickness is conducive to grounding reinforcement and hence to enhanced shielding capability in the multilayer capacitors 10H and 10I, thus inhibiting noise from intrusion into the second signal internal electrode 4b. Moreover, the multilayer capacitors 10H and 10I achieve an improvement in abutment between a case or the like and the first to fourth grounding external terminals 5a to 5d, or abutment between a case or the like and the ground electrode 7B.

Thus constructed, in each of the multilayer capacitor 10H and the multilayer capacitor 10I, the ground electrode 7B may abut directly on the case or the like for accommodating a circuit board. This allows for easy abutment with the case or the like, and also increases the abutting areas of the ground electrode 7B and the case or the like, thus achieving further grounding reinforcement.

It should be understood that the application of the invention is not limited to Embodiments 1 to 5 thus far described, and that various changes, modifications, and improvements are possible without departing from the scope of the invention.

REFERENCE SIGNS LIST

1: Stacked body
1a: Dielectric layer
2, 20, 200: First grounding internal electrode
2a, 2A, 2AA: First grounding electrode
2aa: Lead-out part
2ab, 2ac: Corner
2b, 2B, 2BA: Second grounding electrode
2ba: Lead-out part
2bb, 2bc: Corner
3, 30, 300: Second grounding internal electrode
3a, 3A, 3AA: Third grounding electrode
3aa: Lead-out part
3ab, 3ac: Corner
3b, 3B, 3BA: Fourth grounding electrode
3ba: Lead-out part
3bb, 3bc: Corner
4: Signal internal electrode
4a: First signal internal electrode
4b: Second signal internal electrode
4c: Third signal internal electrode
5: Grounding external terminal
5a: First grounding external terminal
5b: Second grounding external terminal
5c: Third grounding external terminal
5d: Fourth grounding external terminal
6: Signal external terminal
6a: First signal external terminal
6b: Second signal external terminal
10, 10A-10I: Multilayer capacitor

The invention claimed is:

1. A multilayer capacitor, comprising:
a stacked body which is composed of a stack of a plurality of dielectric layers and has a pair of principal surfaces, a pair of side surfaces, and a pair of end faces, the stacked body being of a form of rectangular parallelepiped;
a first grounding internal electrode including a rectangular first grounding electrode having a lead-out part led to one of the pair of side surfaces and a rectangular second grounding electrode having a lead-out part led to the other one of the pair of side surfaces, the rectangular first grounding electrode and the rectangular second grounding electrode being disposed side by side along the pair of side surfaces within one and a same plane in the stacked body;
a second grounding internal electrode including a rectangular third grounding electrode which is positioned so as to overlap the first grounding electrode in a stacking direction, and has a lead-out part led to the other one of the pair of side surfaces, and a rectangular fourth grounding electrode which is positioned so as to overlap the second grounding electrode in the stacking direction, and has a lead-out part led to one of the pair of side surfaces, the rectangular third grounding electrode and the rectangular fourth grounding electrode being disposed side by side along the pair of side surfaces within one and the same plane in the stacked body;
a rectangular first signal internal electrode disposed between the first grounding internal electrode and the second grounding internal electrode so as to confront the first grounding internal electrode and the second grounding internal electrode in the stacking direction, the rectangular first signal internal electrode being led to at least one of the pair of end faces of the stacked body;
first to fourth grounding external terminals which are each disposed on corresponding one of the pair of side surfaces of the stacked body and are connected with corresponding one of the lead-out parts, respectively, of the first to fourth grounding electrodes; and
a pair of signal external terminals which are each disposed at corresponding one of the pair of end faces of the stacked body and are connected with the first signal internal electrode,
the first grounding internal electrode having corners curved as seen in a plan view in the stacking direction, and the second grounding internal electrode having corners curved as seen in a plan view in the stacking direction, the corners of the first grounding internal electrode being at adjacent opposed sides of the rectangular first and second grounding electrodes, the corners being each located on an opposite side to the lead-out part of the rectangular first grounding electrode which is led to one of the pair of side surfaces and to the lead-out part of the rectangular second grounding electrode which is led to the other one of the pair of side surfaces, the corners of the second grounding internal electrode being at adjacent opposed sides of the rectangular third and fourth grounding electrodes, the corners being each located on an opposite side to the lead-out part of the rectangular third grounding electrode which is led to one of the pair of side surfaces and to the lead-out part of the rectangular fourth grounding electrode which is led to the other one of the pair of side surfaces.

2. The multilayer capacitor according to claim 1, wherein, the first grounding internal electrode has corners curved as seen in a plan view in the stacking direction, and the second grounding internal electrode has corners curved as seen in a plan view in the stacking direction, the corners of the first grounding internal electrode being at adjacent opposed sides of the rectangular first and second grounding electrodes, the corners being located on a same side as the lead-out part of the rectangular first grounding electrode which is led to one of the pair of side surfaces and as the lead-out part of the rectangular second grounding electrode which is led to the other one of the pair of side surfaces, the corners of the second grounding internal electrode being at adjacent opposed sides of the rectangular third and fourth grounding electrodes, the corners being located on a same side as the lead-out part of the rectangular third grounding electrode which is led to one of the pair of side surfaces and as the lead-out part of the rectangular fourth grounding electrode which is led to the other one of the pair of side surfaces.

3. The multilayer capacitor according to claim 1, wherein, in the first grounding internal electrode, at each of the adjacent opposed sides of the rectangular first and second grounding electrodes, an edge of the lead-out part of the rectangular first grounding electrode which is led to one of the pair of side surfaces coincides with a line of continuation of a side of the rectangular first grounding electrode, as seen in a plan view in the stacking direction, and an edge of the lead-out part of the rectangular second grounding electrode which is led to the other one of pair of the side surfaces coincides with a line of continuation of a side of the rectangular second grounding electrode, as seen in a plan view in the stacking direction, in the second grounding internal electrode, at each of the adjacent opposed sides of the third and fourth grounding electrodes, an edge of the lead-out part of the rectangular third grounding electrode which is led to one of the pair of side surfaces coincides with a line of continuation of a side of the rectangular third grounding electrode, as seen in a plan view in the stacking direction, and an edge of the lead-out part of the rectangular fourth grounding electrode which is led to the other one of the pair of side surfaces coincides with a line of continuation of a side of the rectangular fourth grounding electrode, as seen in a plan view in the stacking direction.

4. The multilayer capacitor according to claim 1, further comprising:

a rectangular second signal internal electrode disposed between the first grounding internal electrode or the second grounding internal electrode and one of the pair of principal surfaces of the stacked body in the stacking direction so as to confront the first grounding internal electrode or the second grounding internal electrode in the stacking direction, the rectangular second signal internal electrode being led to at least one of the pair of end faces of the stacked body; and a ground electrode which is disposed on the one principal surface so as to be spaced from the pair of signal external terminals and is electrically connected with the first to fourth grounding external terminals, wherein the ground electrode is opposed to the second signal internal electrode in the stacking direction.

5. The multilayer capacitor according to claim 4, wherein one end of each of the pair of signal external terminals extends over the one principal surface, and on the one principal surface, a surface of the ground electrode is located outside an end of each of the pair of signal external terminals in the stacking direction.

6. The multilayer capacitor according to claim 4 or 5, wherein one end of each of the first to fourth grounding external terminals extends over a surface of the ground electrode.

7. The multilayer capacitor according to claim 4, wherein the ground electrode is configured so that a midportion of the ground electrode protrudes outward beyond one end of each of the first to fourth grounding external terminals in the stacking direction.

8. The multilayer capacitor according to claim 7, wherein one end of each of the first to fourth grounding external terminals is disposed so as to overlap an end of a surface of the ground electrode.

9. The multilayer capacitor according to claim 4, wherein the ground electrode is made of an electrically conductive resin material.

\* \* \* \* \*